United States Patent [19]

Katsuragawa

[11] Patent Number: 5,926,325
[45] Date of Patent: *Jul. 20, 1999

[54] OPTICAL APPARATUS

[75] Inventor: Mitsuhiro Katsuragawa, Kanagawa-ken, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/792,921

[22] Filed: Jan. 21, 1997

Related U.S. Application Data

[63] Continuation of application No. 08/354,544, Dec. 13, 1994, abandoned.

[30] Foreign Application Priority Data

Dec. 16, 1993 [JP] Japan ................................. 5-316837

[51] Int. Cl.$^6$ ..................................... G02B 15/14
[52] U.S. Cl. ............................................. 359/698; 359/824
[58] Field of Search ...................... 359/696, 697, 359/698, 822, 823, 824

[56] References Cited

U.S. PATENT DOCUMENTS

| | | | |
|---|---|---|---|
| 4,793,689 | 12/1988 | Aoyagi et al. | 359/825 |
| 5,223,981 | 6/1993 | Kaneda | 359/698 |
| 5,440,212 | 8/1995 | Fukui | 318/116 |

Primary Examiner—Georgia Epps
Assistant Examiner—Dawn-Marie Bey
Attorney, Agent, or Firm—Robin, Blecker & Daley

[57] ABSTRACT

An optical apparatus includes a first lens for zooming, a second lens which is arranged in rear of the first lens on an optical axis to correct a shift of a focal plane caused by a motion of the first lens, a vibration wave motor arranged to serve as a drive source for the second lens, and a decision circuit which decides a driving direction and a driving speed of the vibration wave motor by using at least information on the positions of the first and second lenses.

18 Claims, 19 Drawing Sheets

FIG.8

| NAME | MEANING | INITIALIZED STATE |
|---|---|---|
| Z_ENC | ZOOM POSITION INFORMATION | 0 |
| F_ENC | FOCUS POSITION INFORMATION | 0 |
| Z_ENC1 | ZOOM POSITION INFORMATION OBTAINED WHEN ZOOMING IS AT A ATOP | 0 |
| F_ENC1 | FOCUS POSITION INFORMATION OBTAINED WHEN ZOOMING IS AT A ATOP | 0 |
| T_ENC | DESIRED FOCUS POSITION INFORMATION | 0 |
| Z_SPD | DESIRED ZOOMING SPEED INFORMATION | 0 |
| F_SPD | DESIRED FOCUSING SPEED INFORMATION | 0 |
| TIM_A | TIME VALUE OF TIMER 14 | 0 |
| TIM_B | TIME VALUE OF TIMER 15 | 0 |
| Z_FLAG | H : ZOOMING IN PROCESS / L : ZOOMING AT A STOP | L |
| F_FLAG | H : FOCUSING IN PROCESS / L : FOCUSING AT A STOP | L |

F I G. 9
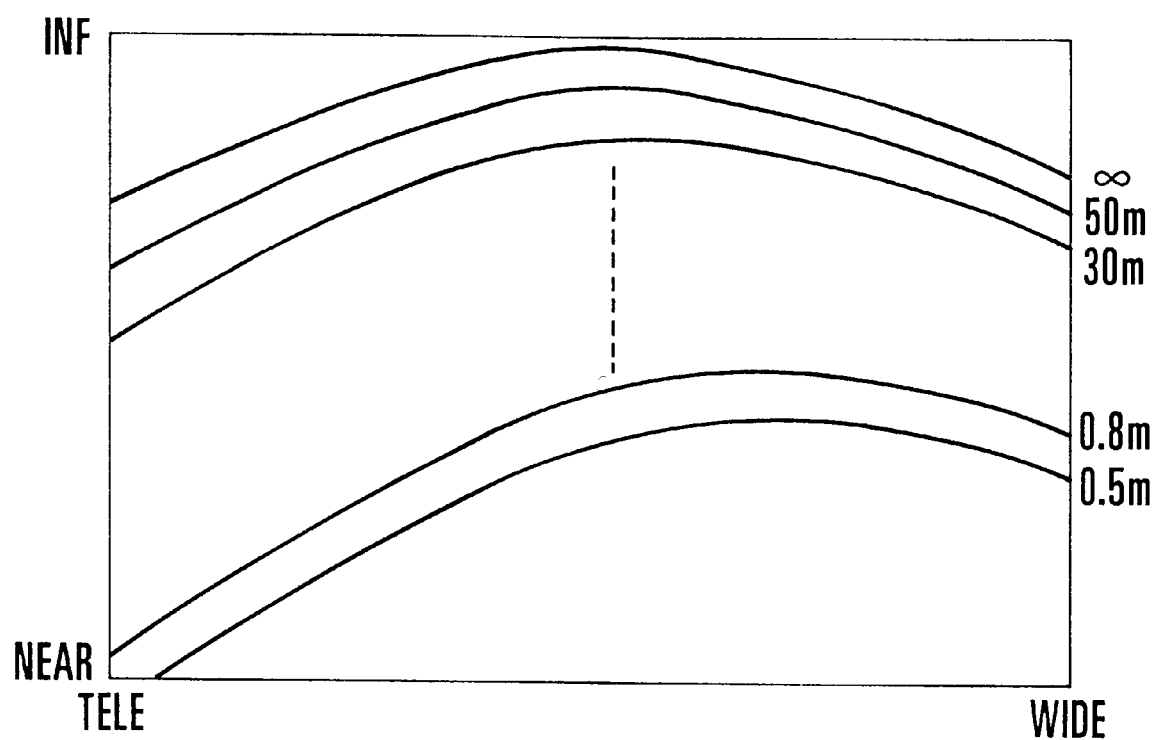

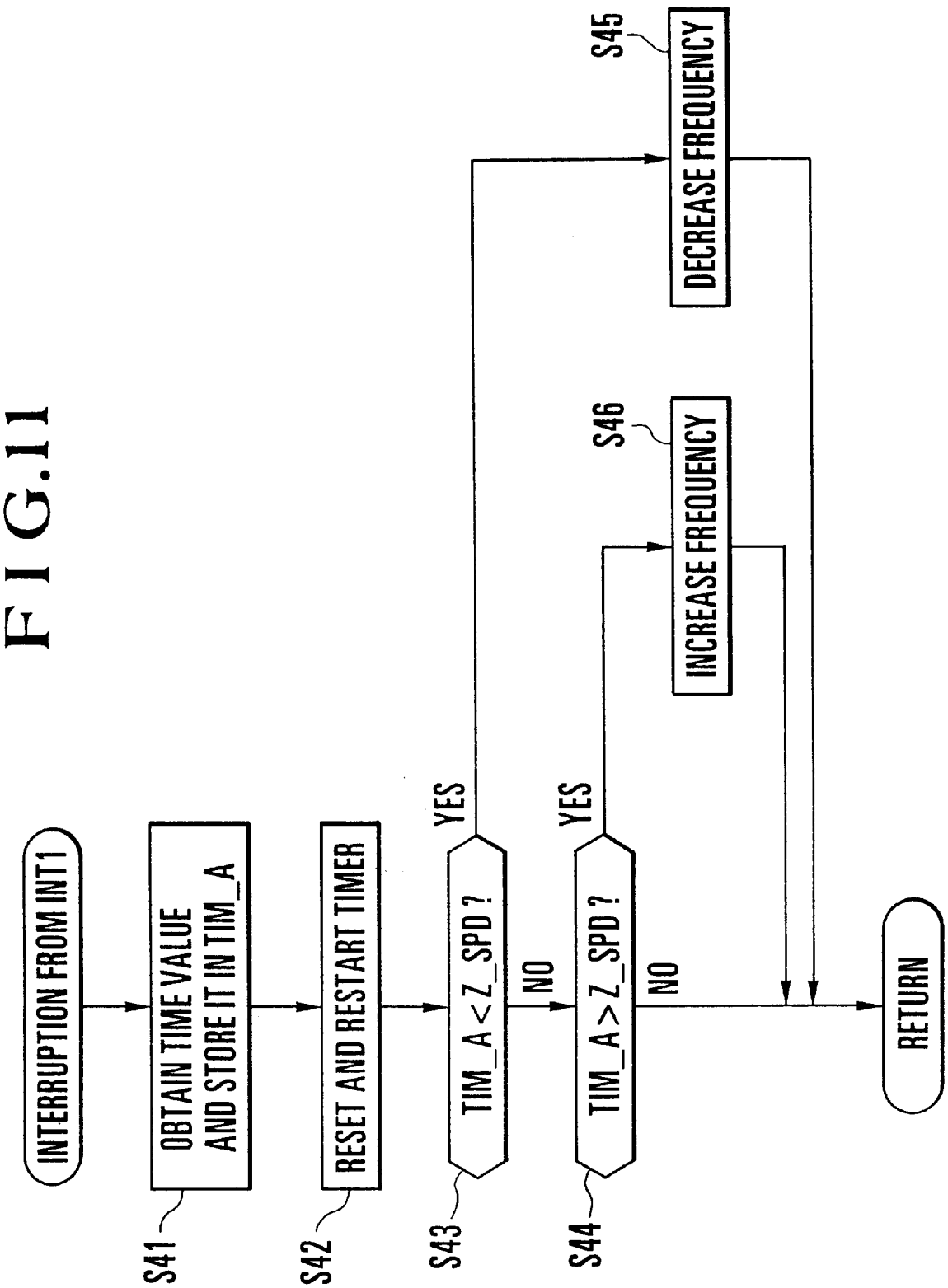

FIG.15

| COUNT VALUE | 0 | 1 | 2 | 3 | 4 | 5 | 6 | 7 |
|---|---|---|---|---|---|---|---|---|
| GATE 82 |   |   |   |   |   |   | 1 | 1 |
| GATE 83 |   | 1 | 1 | 1 |   |   |   |   |
| GATE 84 |   |   |   | 1 | 1 | 1 |   |   |
| GATE 85 | 1 | 1 |   |   |   |   |   | 1 |

FIG. 16

| NAME | MEANING | INITIALIZED STATE |
|---|---|---|
| Z_PLS | ZOOM POSITION INFORMATION | 0 |
| F_PLS | FOCUS POSITION INFORMATION | 0 |
| Z_PLS1 | ZOOM POSITION INFORMATION OBTAINED WHEN ZOOMING IS AT A ATOP | 0 |
| F_PLS1 | FOCUS POSITION INFORMATION OBTAINED WHEN ZOOMING IS AT A ATOP | 0 |
| T_PLS | DESIRED FOCUS POSITION INFORMATION | 0 |
| Z_SPED | DESIRED ZOOMING SPEED INFORMATION | 0 |
| F_SPED | DESIRED FOCUSING SPEED INFORMATION | 0 |
| Z_FLAG | H : ZOOMING IN PROCESS / L : ZOOMING AT A STOP | L |
| F_FLAG | H : FOCUSING IN PROCESS / L : FOCUSING AT A STOP | L |

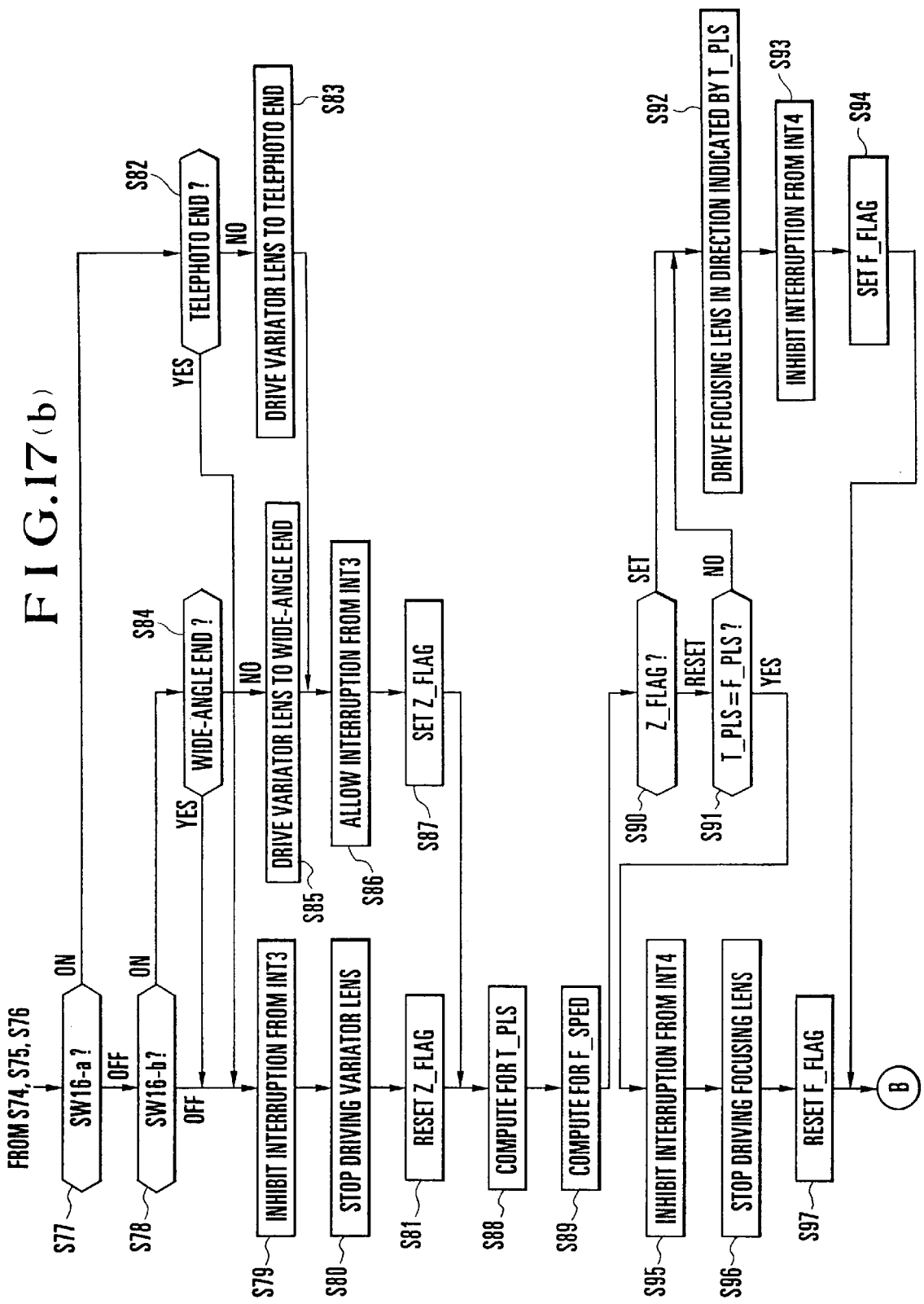

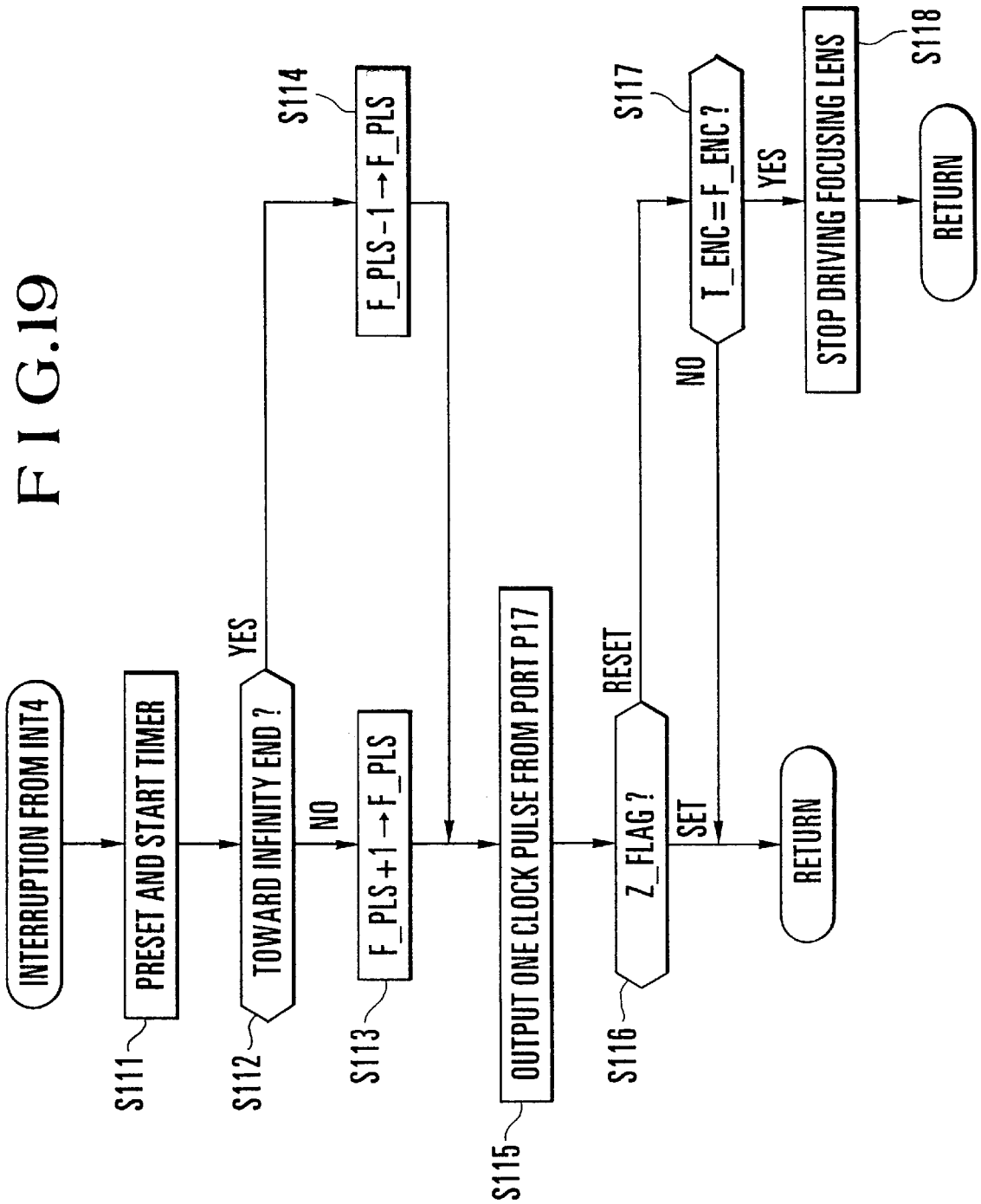

OPTICAL APPARATUS

This is a continuation application under 37 CFR 1.62 of prior application Ser. No. 08/354,544, filed Dec. 13, 1994, now abandoned.

BACKGROUND OF THE INVENTION

1. Field of the Invention

This invention relates to an optical apparatus using a motor as a drive source for moving a lens.

2. Description of the Related Art

In compensating for a defocused state of a zoom lens caused by zooming, a method for correcting focus by mechanical interlocking, for example, through a cam, has been employed. Zoom lenses are in the meantime trending to have a high magnifying rate. However, the conventional mechanical interlocking method has prevented reduction in size of a zoom lens arranged to have a high magnifying power. This problem can be solved by adopting a method of directly driving the lens for focus correction with an actuator without recourse to the mechanical interlocking. For example, some of known video cameras are arranged to use a stepping motor for focus correction and to drive with the stepping motor an optical system to a desired position determined by computation.

On the other hand, use of vibration wave motors have been put into practice to give novel features in the form of a hollow motor and a noiseless motor or the like. The vibration wave motors have come to be employed as lens driving actuators on account of these novel features.

Optical apparatuses of the kind employing a vibration wave motor as a drive source for moving a lens have been disclosed, for example, in U.S. Pat. Nos. 5,216,314, No. 5,278,935, No. 4,793,689, No. 4,660,733, No. 4,743,791, No. 4,560,263, etc.

SUMMARY OF THE INVENTION

One aspect of this invention lies in providing an optical apparatus using a vibration motor as a drive source for driving a focusing lens which is disposed in rear of a variator lens in the direction of an optical axis and arranged to be moved for correcting a defocused state resulting from a magnifying power varying action.

The above and other aspects and features of this invention will become apparent from the following detailed description of embodiments thereof taken in connection with the accompanying drawings.

BRIEF DESCRIPTION OF THE DRAWINGS

FIG. 8 shows the contents of memories arranged within a microcomputer shown in FIG. 1.

FIG. 9 shows a relation between the position of a variator lens and that of a focusing lens obtained at each of different object distances.

FIG. 11 is a flow chart also showing the operation of the circuit arrangement shown in FIG. 1.

FIG. 15 shows a relation of the count values of a binary counter to the outputs of OR gates of FIG. 14.

FIG. 16 shows the contents of memories arranged within a microcomputer shown in FIG. 13.

FIGS. 17(a) and 17(b) are flow charts showing the operation of the circuit arrangement shown in FIG. 13.

FIG. 19 is a further flow chart showing also the operation of the circuit arrangement shown in FIG. 13.

DETAILED DESCRIPTION OF THE PREFERRED EMBODIMENTS

Figure 1:
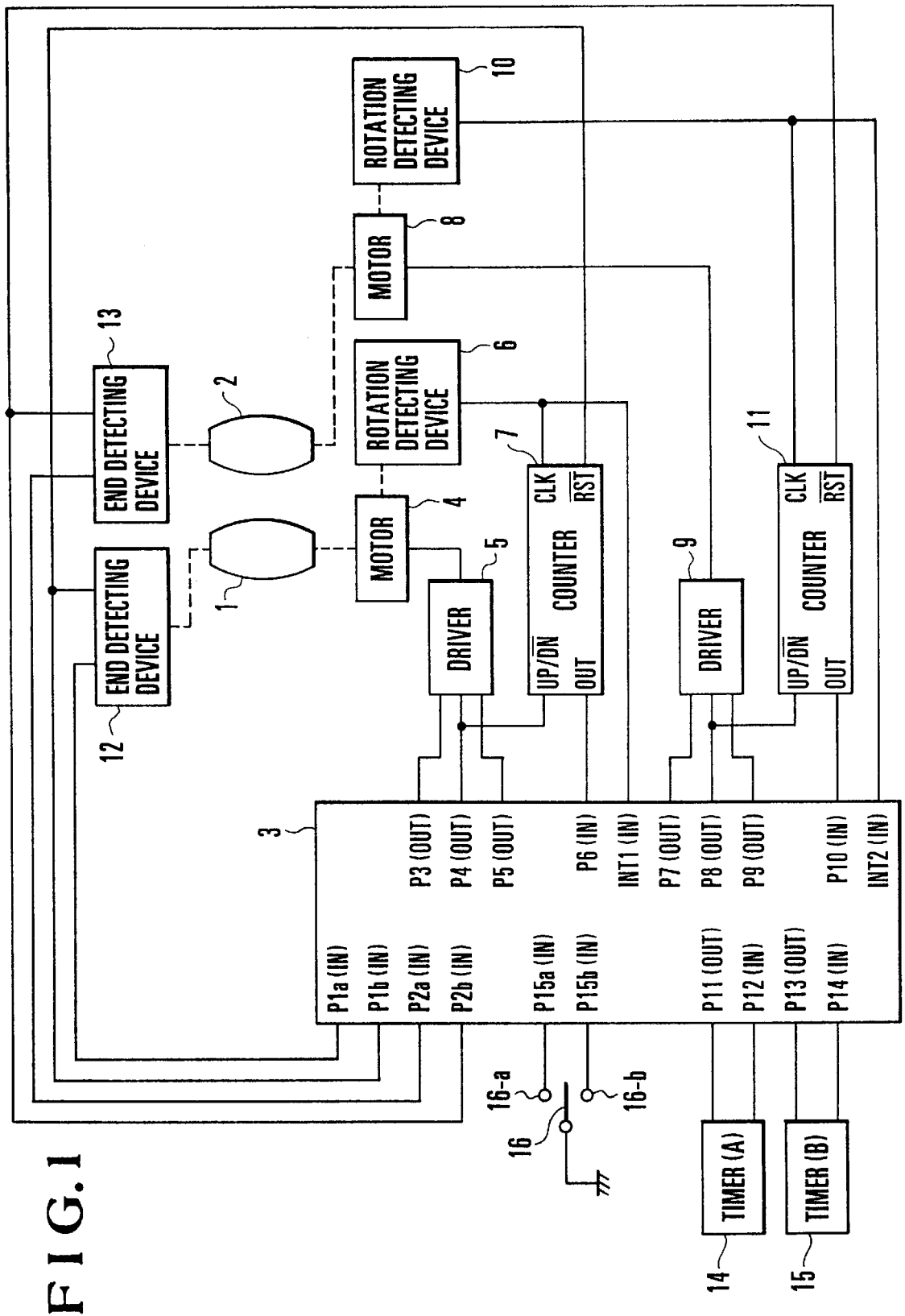
FIG. 1 is a block diagram showing the circuit arrangement of an optical apparatus arranged according to this invention as a first embodiment thereof.

FIG. 1 shows the arrangement of a first embodiment of this invention. In FIG. 1, a reference numeral 1 denotes a variator lens group 1. A numeral 2 denotes a lens group which is arranged to be used for focusing and also for correcting a defocused state caused by a magnifying power varying action (hereinafter referred to as a focusing lens group). A numeral 3 denotes a microcomputer. A vibration wave motor (ultrasonic motor) 4 is provided for driving the variator lens group 1. A driver circuit 5 is arranged to drive the motor 4. A rotation detecting device 6 is arranged to generate a pulse signal according to the rotation of the motor 4. An up-down counter 7 is arranged to receive as a clock input the pulse signal outputted from the rotation detecting circuit 6. A vibration wave motor (ultrasonic motor) 8 is arranged to drive the focusing lens group 2. A driver circuit 9 is arranged to drive the motor 8. A rotation detecting device 10 is arranged to generate a pulse signal according to the rotation of the motor 8. An up-down counter 11 is arranged to receive as a clock input the pulse signal outputted from the rotation detecting device 10. An end detecting device 12 is arranged to output a telephoto end signal and a wide-angle end signal, which indicate respectively the telephoto end position and the wide-angle end position of the variator lens group 1. An end detecting device 13 is arranged to output an infinity end signal and a near distance end signal, which indicate respectively the infinity and nearest distance positions of the focusing lens group 2. Timers 14 and 15 are arranged to operate under the control of the microcomputer 3. A power zoom switch 16 is arranged to be used for driving the motor 4 to move the variator lens group 1 toward the telephoto end when its switching position is on the side of a terminal 16-a and toward the wide-angle end when its position is on the side of another terminal 16-b.

The microcomputer 3 has input and output ports arranged as follows. Input ports P1a and P1b are arranged to receive the telephoto end signal and the wide-angle end signal from the end detecting device 12. Input ports P2a and P2b are arranged to receive the infinity end signal and the near distance end signal from the end detecting device 13. Output ports P3, P4 and P5 are arranged respectively to output a driving on/off signal, a driving direction signal and a speed control signal for the driver circuit 5. An input port 6 is arranged to have the count value of the counter 7 inputted there. Output ports P7, P8 and P9 are arranged respectively to output a driving on/off signal, a driving direction signal and a speed control signal for the driver circuit 9. An input port P10 is arranged to have the count value of the counter 11 inputted there. Output ports P11 and P13 are provided for control over the timers 14 and 15. Input ports P12 and 14 are arranged respectively to obtain time count values from the timers 14 and 15. Input ports P15a and P15b are provided for monitoring the state of the power zoom switch 16. An input port INT1 is arranged to have the pulse signal generated by the rotation detecting device 6 inputted there. An input port INT2 is arranged to have the pulse signal generated by the rotation detecting device 10 inputted there. Both the input ports INT1 and INT2 are arranged to permit interruption when the input signals change from a low level to a high level.

Figure 2:
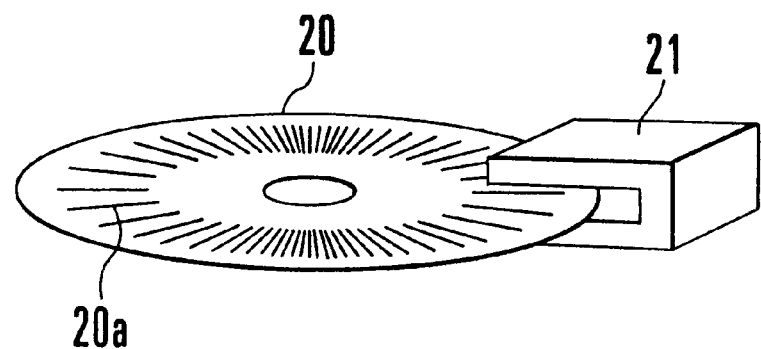
FIG. 2 is an oblique view showing a rotation detecting device shown in FIG. 1.
Figure 3:
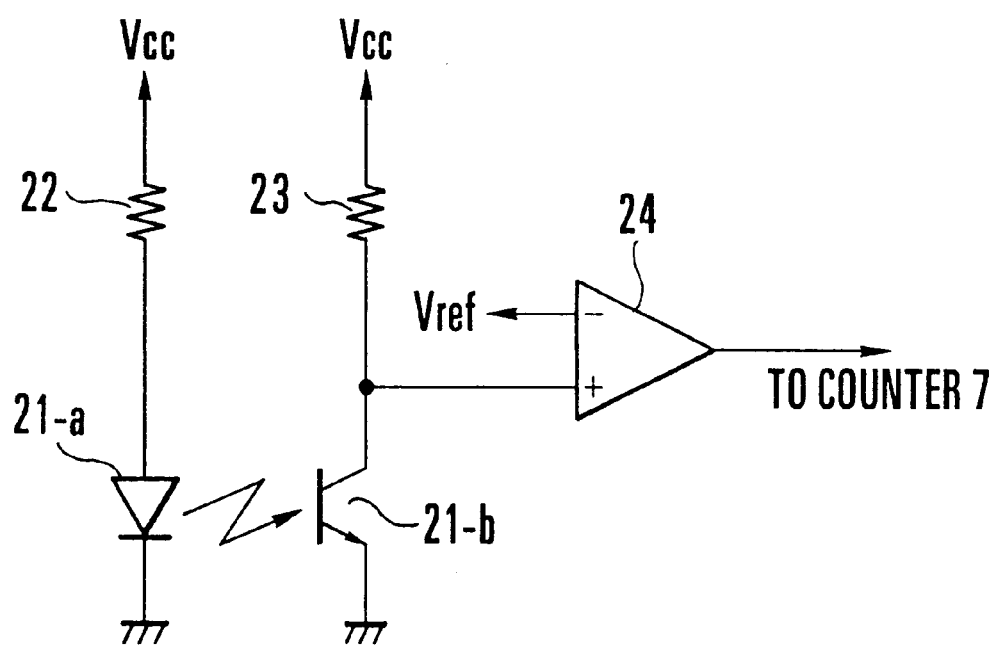
FIG. 3 is a circuit diagram showing the rotation detecting device shown in FIG. 1.

FIGS. 2 and 3 show the details of the rotation detecting device 6. A disk-shaped pulse plate 20 is attached to a rotary member of the motor 4. A photo interrupter 21 is composed of a light emitting diode 21-a and a phototransistor 21-b. The device 6 includes pull-up resistors 22 and 23 and a comparator 24. The pulse plate 20 is provided with slits 20a which are circularly arranged at intervals of a predetermined spacing distance. When the pulse plate 20 rotates, the phototransistor 21-b turns on and off to generate a pulse signal through the resistor 23 and the comparator 24. While the details of the rotation detecting device 6 are as described with reference to FIGS. 2 and 3, the details of the other rotation detecting device 10 are arranged in the same manner as the rotation detecting device 6.

Figure 4:
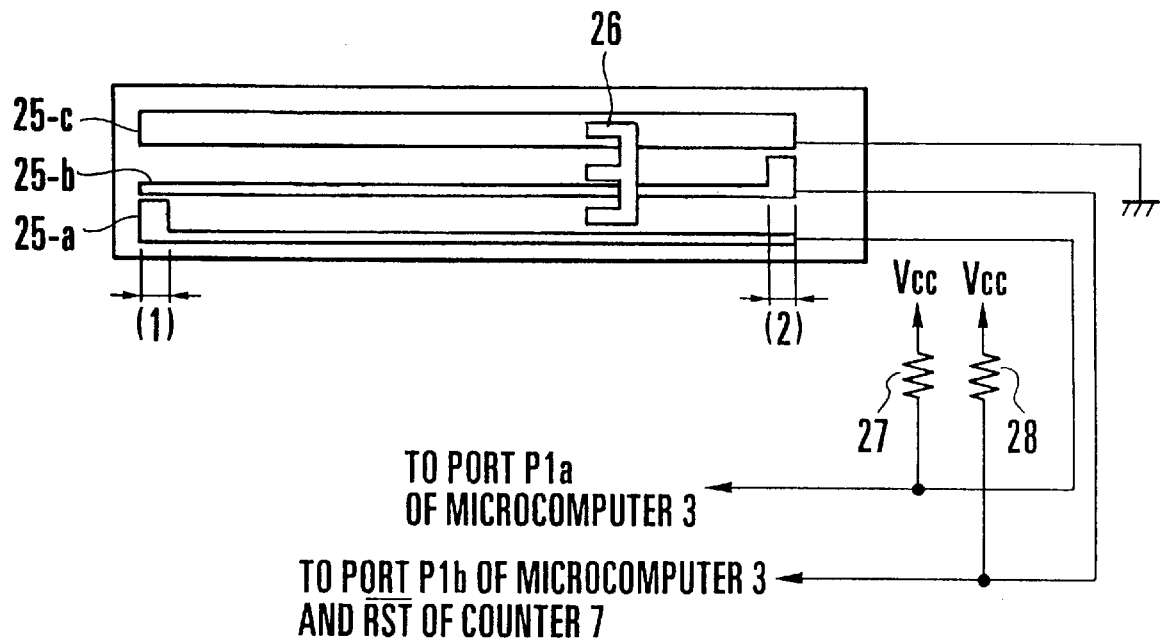
FIG. 4 shows the arrangement of an end detecting device shown in FIG. 1.

FIG. 4 shows the details of the end detecting device 12. Referring to FIG. 4, the end detecting device 12 is arranged as follows. Conductive patterns 25-a, 25-b and 25-c are mounted on a fixed part. A brush 26 is arranged to slide over the conductive patterns 25-a, 25-b and 25-c when the lens group 1 moves. Reference numerals 27 and 28 denote pull-up resistors. The conductive pattern 25-a is connected to the pull-up resistor 27 and also to the port P1a of the microcomputer 3. The conductive pattern 25-b is connected to the pull-up resistor 28, to the port P1b of the microcomputer 3 and also to the reset input of the counter 7. The conductive pattern 25-c is connected to the ground. When the brush 26 is caused to come to a part (1) of FIG. 4 by a motion of the lens group 1, the conductive pattern 25-a is connected to the conductive pattern 25-c through the brush 26. Then a low level signal is inputted to the port P1a of the microcomputer 3. At any part other than the part (1), the conductive pattern 25-a is not connected to the conductive pattern 25-c and a high level signal is inputted to the port P1a of the microcomputer 3. When the brush is caused by a motion of the lens group 1 to come to a part (2), the conductive pattern 25-b is connected to the conductive pattern 25-c through the brush 26. Then a low level signal is inputted to the port P1b of the microcomputer 3 and also to the reset input of the counter 7. At any part other than the part (2), the conductive pattern 25-b is not connected to the conductive pattern 25-c and a high level signal is inputted to the port P1b of the microcomputer 3 and also to the reset input of the counter 7. With the part or area (1) of FIG. 4 arranged to be a telephoto end position and another part (2) to be a wide-angle end position, the telephoto end signal and the wide-angle end signal can be detected. Further, since the wide-angle end signal is arranged to be supplied to the reset input of the counter 7, the counter 7 is reset at a wide-angle end position.

Figure 5:
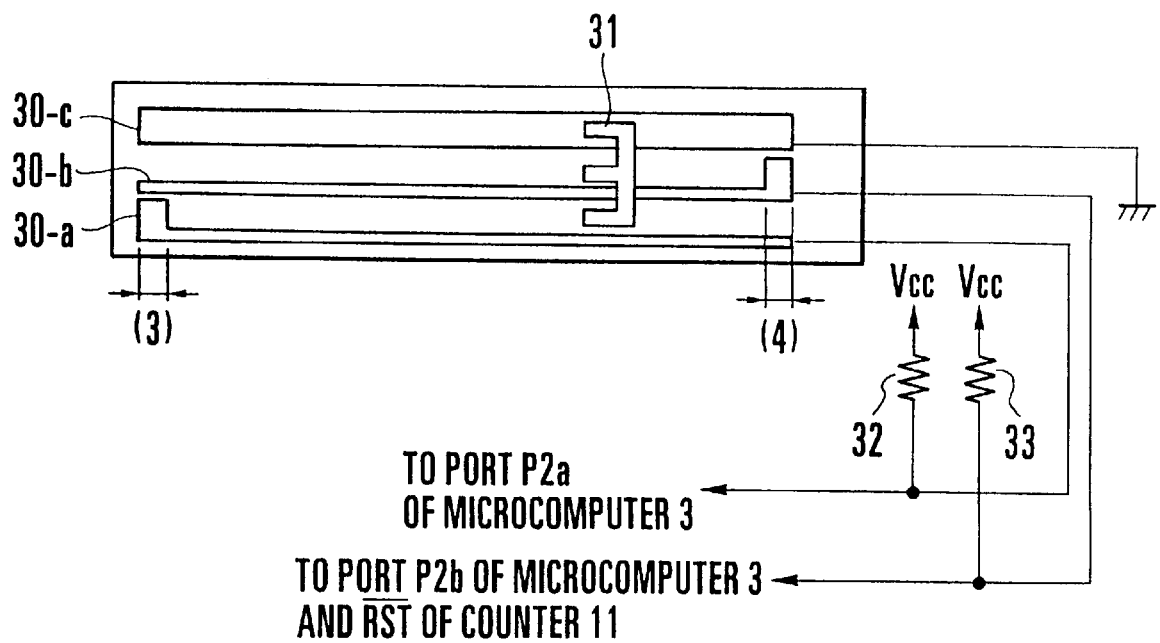
FIG. 5 shows the arrangement of another end detecting device which is also shown in FIG. 1.

FIG. 5 shows the details of the end detecting device 13, which is arranged as follows. Conductive patterns 30-a, 30-b and 30-c are mounted on a fixed part. A brush 31 is arranged to slide over these conductive patterns 30. The end detecting device 13 includes pull-up resistors 32 and 33. The conductive pattern 30-a is connected to the pull-up resistor 32 and also to the port P2a of the microcomputer 3. The conductive pattern 30-b is connected to the pull-up resistor 33, to the port P2b of the microcomputer 3 and also to the reset input of the counter 11. The conductive pattern 30-c is connected is to the ground. When a motion of the lens group 2 causes the brush 31 to come to a part (3) of FIG. 5, the conductive pattern 30-a is connected to the conductive pattern 30-c through the brush 31. As a result, a low level signal is inputted to the part P2a of the microcomputer 3. At any part other than the part (3), the conductive patter 30-a is not rendered conductive and, in that case, a high level signal is inputted to the port P2a of the microcomputer 3. When the brush 31 is moved to another part (4) also by a motion of the lens group 2, the conductive pattern 30-b is connected to the conductive pattern 30-c through the brush 31. Then a low level signal is inputted to the port P2b of the microcomputer 3 and also to the reset input of the counter 11. At any part other than the part (4), the conductive pattern 30-b is not connected to the conductive pattern 30-c and, in that case, a high level signal is inputted to the port P2b of the microcomputer 3 and the reset input of the counter 11. With the part (3) arranged to be a nearest distance end position and the part (4) to be an infinity end position, the near distance end signal and the infinity end signal can be detected. Further, since the infinity end signal is arranged to be supplied to the reset input of the counter 11, the counter 11 is reset at the infinity end position.

Figure 6:
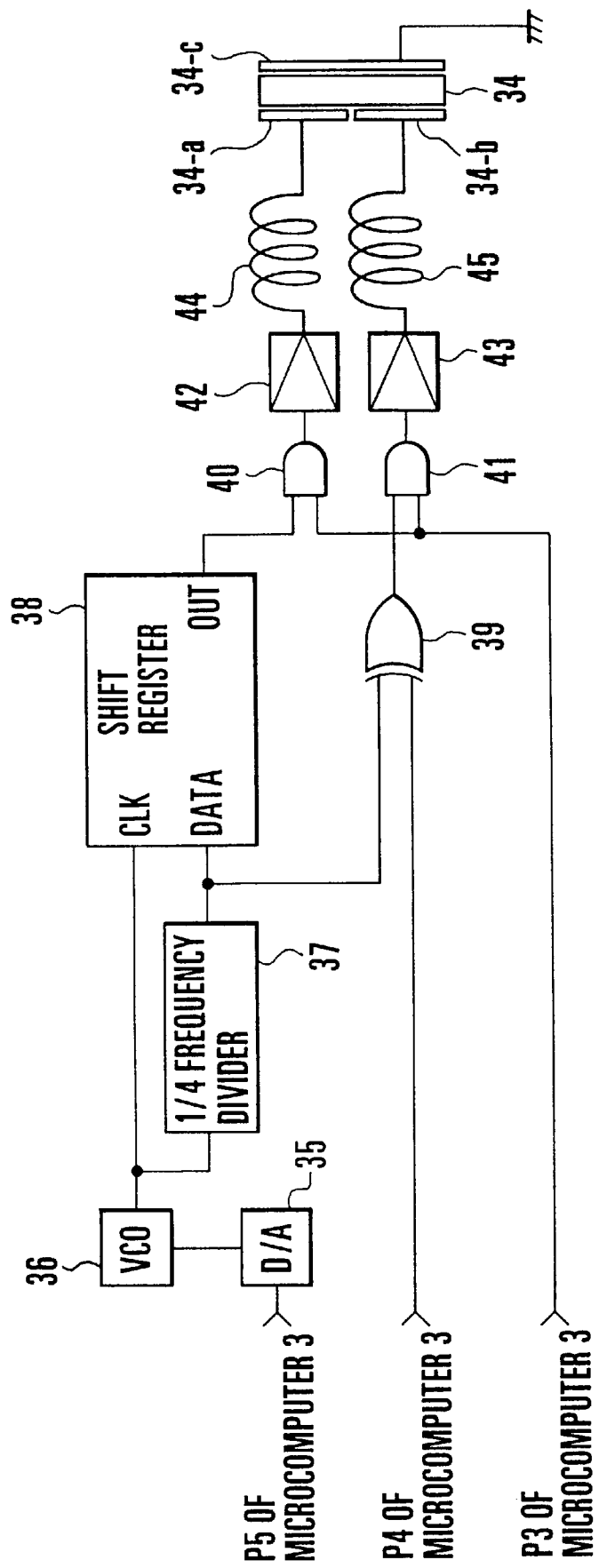
FIG. 6 is a circuit diagram showing the details of a motor and a driver circuit shown in FIG. 1.
Figure 7:
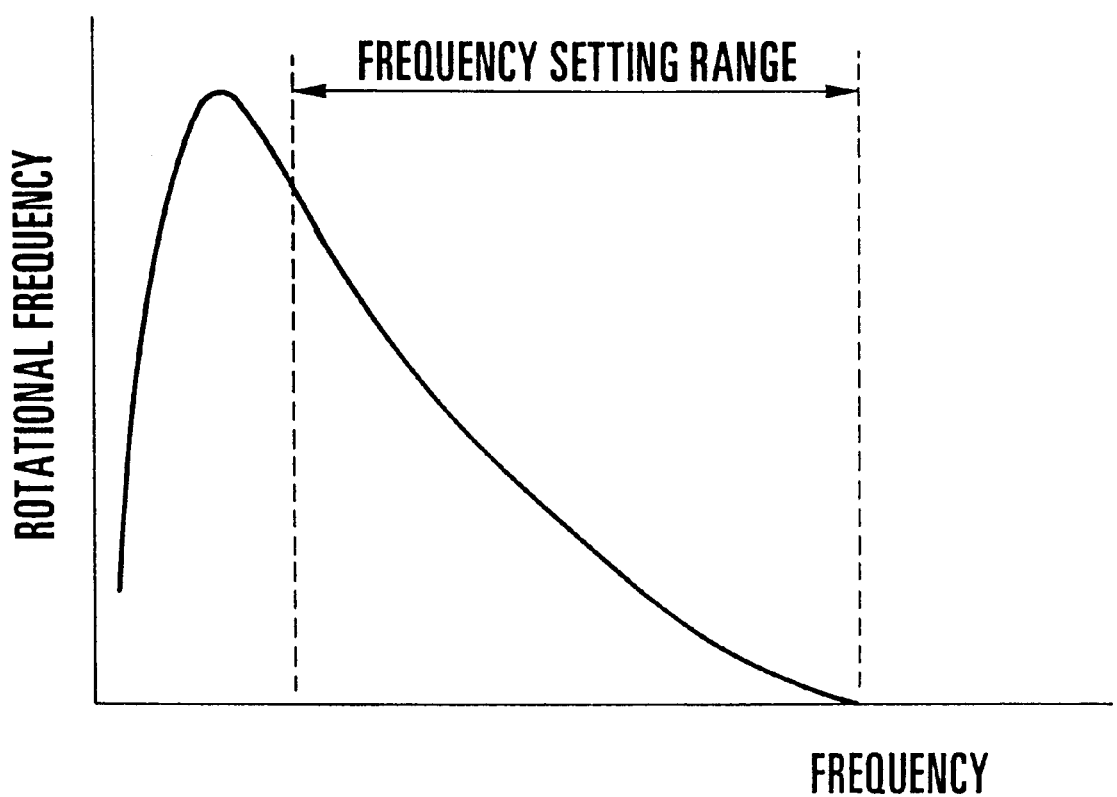
FIG. 7 is a graph showing the characteristic of rotation frequency of the motor in relation to frequency.

FIG. 6 shows the details of the vibration wave motor 4 and those of the driver (circuit) 5. Referring to FIG. 6, the vibration wave motor 4 is provided with a stator (vibrator) 34. Two groups of electrostrictive elements which have been subjected to a polarizing process are arranged on the surface of the stator 34. Driving electrodes 34-a and 34-b are arranged to apply wave signals having a phase difference of 90 degree from each other to the two groups of electrostrictive elements. A common electrode 34-c is provided for the electrodes 34-a and 34-b. Generally, a vibration wave motor has a rotating speed characteristic in relation to the frequency applied as shown in FIG. 7. Therefore, the rotating speed of the vibration wave motor can be controlled by adjusting the frequency to be applied to the motor. The speed control signal to be applied from the port P5 of the microcomputer 3 thus can be replaced with a frequency control signal. A D/A converter 35 is arranged to convert the frequency control signal coming from the port P5 of the microcomputer 3 into an analog signal. A voltage controlled oscillator 36 (abbreviated to VCO) is arranged to process the frequency control signal which has been converted into an analog voltage form to further convert it into a wave signal. A frequency divider 37 is arranged to divide the wave signal of the VCO 36 into a signal of ¼ frequency. A shift register 38 is arranged to receive the output of the frequency divider 37 as a data input and the output of the VCO 36 as a clock input. The output of the shift register 38 is a wave signal of a phase delaying 90 degrees from that of the wave signal outputted from the frequency divider 37. An exclusive OR gate 39 has one of its two input terminals connected to the output of the frequency divider 37 and the other connected to the port P4 of the microcomputer 3. With the driver arranged in this manner, the exclusive OR gate 39 outputs the same signal as the output of the frequency divider 37 if the logic of the port P4 of the microcomputer 3 is a low level and outputs a signal obtained by inverting the logic of the output of the frequency divider 37 if the logic of the port P4 of the microcomputer 3 is a high level.

In other words, the shift register 38 outputs a wave signal of a phase delaying 90 degrees from a wave signal outputted by the exclusive OR gate 39 if the logic of the port P4 is a low level and outputs a wave signal of a phase advanced 90 degree from the wave signal outputted by the exclusive OR gate 39 if the logic of the port P4 is a high level. The rotating direction of the vibration wave motor 4 can be changed by virtue of this arrangement. In the case of this (first) embodiment, the motor 4 is thus arranged to rotate in the direction of moving the variator lens group 1 toward the telephoto end position when the port P4 of the microcomputer 3 is at a high level and in the direction of moving the variator lens group 1 toward the wide-angle end position when the port P4 is at a low level. Each of AND gates 40 and 41 has one of its two input terminals connected to the output of the shift register 38 or to that of the exclusive OR gate 39 and the other connected to the port P3 of the microcomputer 3. The wave signal inputted to one of the input terminals is outputted to the AND gates 40 and 41 when the port P3 is at a high level. Reference numerals 42 and 43 denote amplifying circuits while numerals 44 and 45 denote coils provided for voltage boosting. The output of the AND gate 40 is applied to the electrode 34-a through the amplifying circuit 42 and the coil 44. The output of the AND gate 41 is applied to the electrode 34-b through the amplifying circuit 43 and the coil 45. As described above, the frequency to be applied to the vibration wave motor 4 is set by the output of the port P5 of the microcomputer 3 while the rotating direction of the motor 4 is set by the output of the port P4. Further, the on-off control over the vibration wave motor 4 is performed by the port P3.

The other vibration wave motor 8 is arranged in the same manner as the arrangement described above and, therefore, it is omitted from the following description.

FIG. 8 shows the contents of memories arranged according to this invention within the microcomputer 3 of the first embodiment. The memories include a memory: Z_ENC arranged to store a count value obtained from the counter 7; a memory F_ENC arranged to store a count value obtained from the counter 11; a memory Z_FLAG arranged to show whether the variator lens group 1 is in process of being driven or at a stop; a memory T_ENC arranged to show information on a desired position of the focusing lens group 2 for correction of a defocused state caused by a motion of the variator lens group 1; a memory Z_SPD arranged to show information on a variator lens group driving speed as expressed through the period of output pulses of the rotation detecting device 6; a memory F_SPD arranged to show information on a focusing lens driving speed as expressed through the period of output pulses of the rotation detecting device 10; a memory Z_FLAG arranged to show whether the focusing lens group 2 is in process of being driven or at a step; a memory F_FLAG arranged to show whether a defocused state caused by a motion of the variator lens group 1 is in process of being corrected; a memory TIM_A arranged to store a timer (time count) value obtained from the timer 14; and a memory TIM_B arranged to store a timer (time count) value obtained from the timer 15.

The counter 7 counts the pulses of the pulse signal outputted from the rotation detecting device 6 as a clock input. However, the count up/down selection input of the counter 7 is connected to the port P4 of the microcomputer 3 from which the direction control signal for the motor 4 is outputted, as shown in FIG. 1. The counter 7, therefore, counts upward or downward the pulses of the pulse signal according to the driving direction of the motor 4. In other words, the pulses are counted upward when the variator lens group 1 is driven toward the telephoto end by the motor 4 and are counted down when the variator lens group 1 is driven toward the wide-angle end. The counter 7 is reset when the variator lens group 1 reaches the wide-angle end position. The count value of the counter 7 thus can be regarded as information on the position (absolute position) of the variator lens group 1. The counter 11 likewise counts upward when the focusing lens group 2 is driven by the motor 8 toward the near (nearest) distance end and downward when the focusing lens group 2 is driven toward the infinity end. The counter 11 is rest when the focusing lens group 2 reaches the infinity distance end position. Therefore, the count value of the counter 11 also can be regarded as information on the absolute position of the focusing lens group 2. Both the memories Z_ENC and Z_ENC1 thus show information on the position of the variator lens group 1 and both the memories F_ENC and F_ENC1 show information on the position of the focusing lens group 2.

The memories thus store data of the position of the focusing lens group 2 as in relation to the position of the variator lens group 1 for each of various object distances, as shown shown in FIG. 9. The position of the focusing lens group 2 thus can be obtained for correction of a defocused state due to any movement of the variator lens group 1 by using the data stored.

Figure 10A:
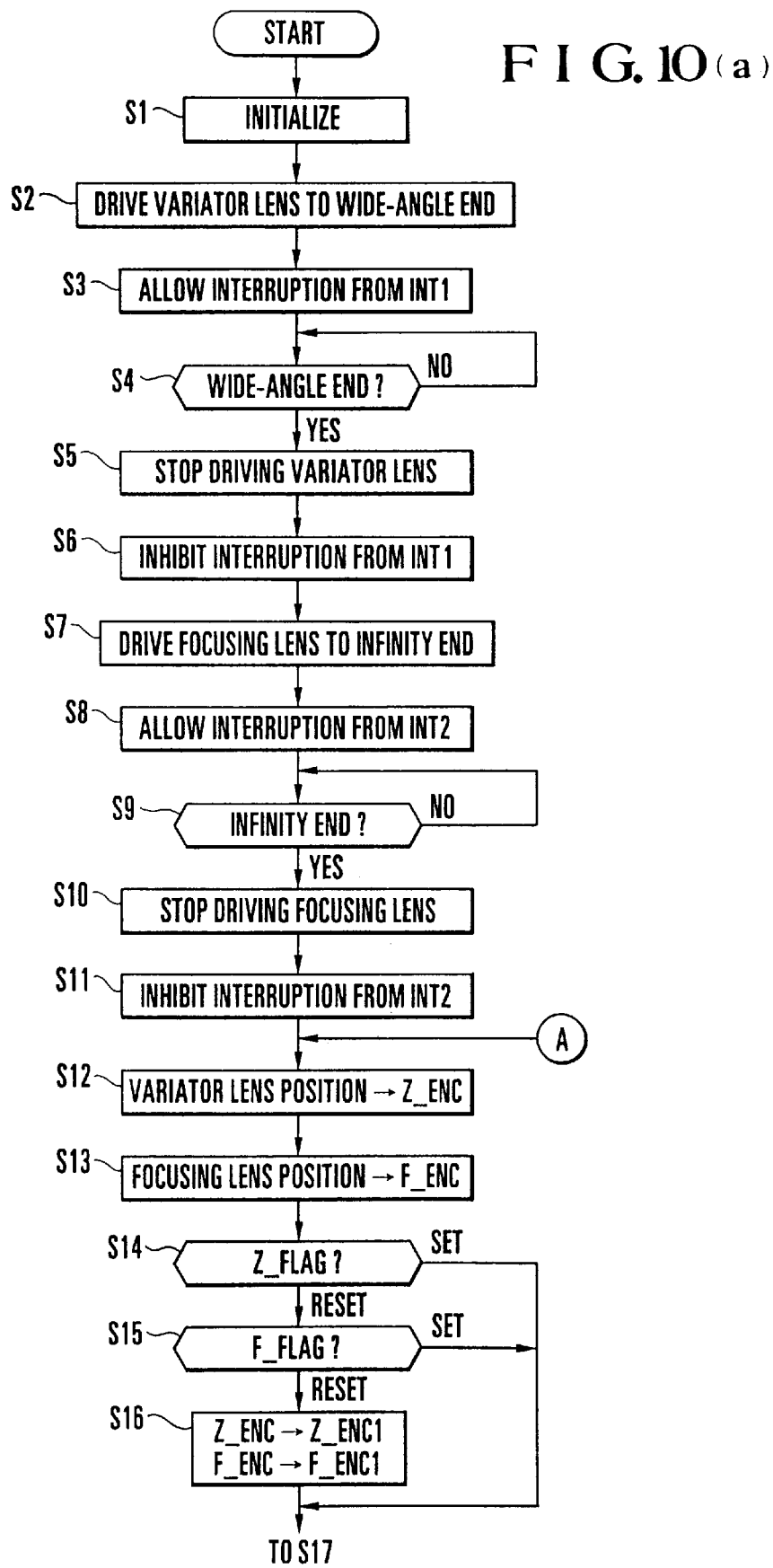
FIGS. 10(a) and 10(b) are flow charts showing the operation of the circuit arrangement shown in FIG. 1.
Figure 10B:
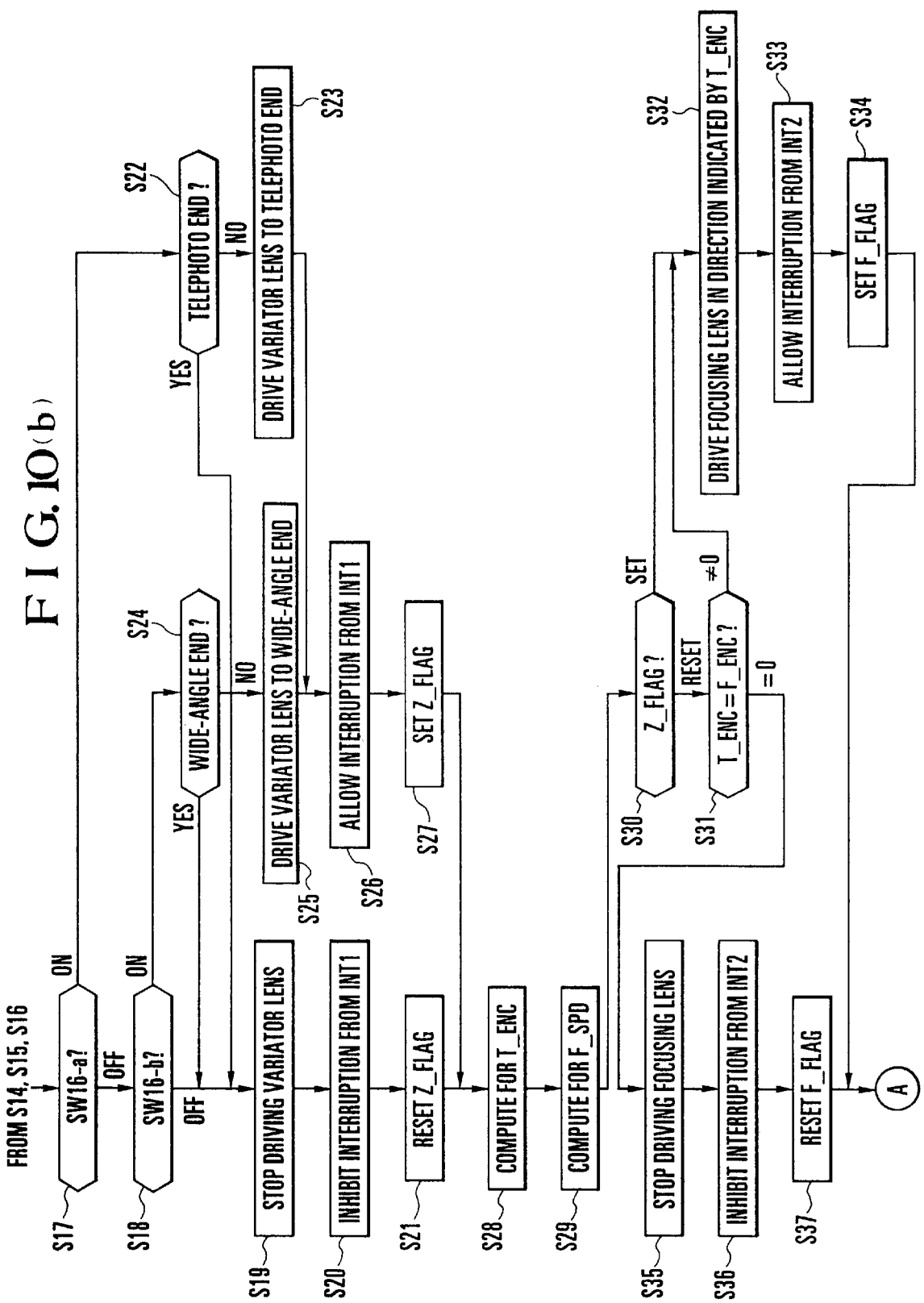

FIGS. 10(a) and 10(b) are flow charts showing the operation of the microcomputer 3 of this embodiment. The operation is described with reference to FIGS. 10(a) and 10(b) as follows. At a step S1, when a power supply switch which is not shown is turned on, the microcomputer 3 initializes the memories which are as shown in FIG. 8. At the same time, the count values of the counters 7 and 11 are also reset. At a step S2, a predetermined value Z_SPD0 which is stored in the memory Z_SPD is outputted to the ports P3, P4 and P5 to drive the variator lens group 1 to the wide-angle end position, because the position of the variator lens group 1 is not fixed when the counter 7 is reset by the step 1 and, therefore, the counter 7 must be reset with the variator lens group 1 set at the wide-angle end position. At a step S3, an interruption is allowed from the port INT1.

At a step S4, a wide-angle end signal is taken in from the port P1b. If the variator lens group 1 is found to be not at the wide-angle end position, shown at the part (2) of FIG. 4, the step S4 is repeated. If the lens group 1 is found to be at the wide-angle end position, the flow of operation comes to a step S5. At the step S5, the driving action on the variator lens group 1 is brought to a stop. Then the counter 7 is reset.

At a step S6, the interruption from the port INT1 is inhibited. At a step S7, a predetermined value F_SPD0 which is stored in the memory F_SPD is outputted to the ports P7, P8 and P9 to drive the focusing lens group 2 to the infinity end position, because the position of the focusing lens group 2 is not fixed when the counter 11 is reset at the step S1 and, therefore, the counter 11 must be reset with the focusing lens group 2 set at the infinity end position. At a step S8, an interruption from the port INT2 is allowed.

At a step S9, an infinity end signal is taken in from the port P2b to find if the focusing lens group 2 is at the infinity end position, i.e. the part (4) of FIG. 5. If not, the step S9 is repeated. If so, the flow comes to a step S10. At the step S10, the driving action on the focusing lens group 2 is brought to a stop. Then the counter 11 is reset. At a step S11, the interruption is inhibited from the port INT2. At a step S12, the count value of the counter 7, i.e. information on the position of the variator lens group 1, is inputted from the port P6 and is stored in the memory Z_ENC. At a step S13, the count value of the counter 11, i.e. information on the position of the focusing lens group 2, is inputted from the port P10 and is stored in the memory F_ENC.

At a step S14, a check is made for the state of the memory Z_FLAG. If the memory Z_FLAG is in a set state thus indicating that the variator lens group 1 is in process of being driven, the flow comes to a step S17. If the memory Z_FLAG is in a reset state, thus indicating that the variator lens group 1 is at a stop, the flow comes to a step S15. At the step S15, a check is made for the state of the memory F_FLAG. If the memory F_FLAG is in a set state thus indicating that the focusing lens group 2 is in process of being driven, the flow comes to a step S17. If the memory F_FLAG is found to be in a reset state thus indicating that the focusing lens group is at a stop, the flow comes to a step S16.

Since both the variator and focusing lens groups 1 and 2 are at rest, at the step S16, the contents of the memories Z_ENC and F_ENC stored by the steps S12 and S13 are copied and stored respectively in the memories Z_ENC1 and F_ENC1. At a step S17, a check is made to find if the power zoom switch 16 is in an on-state on the side of its terminal 16-a. If so, the flow comes to a step S22. If the power zoom switch 16 is found to be in an on-state on the side of the other terminal 16-b, the flow comes to a step S24. If the power zoom switch 16 is neither on the side of the terminal 16-a nor on the side of the terminal 16-b, the flow comes to a step S19.

At the step S19, the variator lens group 1 is brought to a stop as the power zoom switch is not in an on-state, neither on the side of the terminal 16-a nor on the side of the terminal 16-b. At a step S20, the interruption from the port INT1 is inhibited. At a step P21, since the variator lens group 1 has been brought to a stop by the step S19, the memory Z_FLAG is reset and the flow comes to a step S28.

At the step S22, a telephoto end signal is taken in from the port P1a to find if the variator lens group 1 is at the part (1) shown in FIG. 4. If so, the flow comes to the step S19 to bring the variator lens group 1 to a stop, because it is impossible to drive it further toward the telephoto end position. If not, the flow comes to a step S23. At the step S23, since the variator lens group 1 has not reached the telephoto end position as yet while the power zoom switch 16 is in the on-state on the side of the terminal 16-a, the predetermined value Z_SPD0 is stored in the memory Z_SPD and outputted from the ports P3, P4 and P5 to drive the vaiator lens group 1 toward the telephoto end position and the flow comes to a step S26.

At the step S24, the wide-angle end signal is taken in to find if the variator lens group 1 is at the wide-angle end position as shown at the part (2) of FIG. 4. If so, the flow comes to the step S19 to bring the variator lens group 1 to a stop, as further driving toward the wide-angle end is impossible. If not, the flow comes to a step S25. At the step S25, since the variator lens group 1 has not reached the wide-angle end position as yet while the power zoom switch 16 is in its on-state on the side of the terminal 16-b, the predetermined value Z_SPD0 is stored in the memory Z_SPD and is outputted from the ports P3, P4 and P5 to drive the variator lens group 1 toward the wide-angle end position.

At a step S26, an interruption from the port INT1 is allowed. At a step S27, since the variator lens group 1 has been driven at the step S23 or S25, the memory Z_FLAG is set and the flow comes to a step S28.

At the step S28, using the contents of the memories Z_ENC1 and F_ENC1 and position data of the focusing lens group 2 in relation to the position of the variator lens group 2 obtained for each of various object distances shown in FIG. 9, an object distance (hereinafter referred to as "L") is obtained when both the variator and focusing lens groups 1 and 2 are at rest. Further, from the object distance L and the memory Z_ENC which shows the current position of the variator lens group 1, an in-focus position of the focusing lens group 2 is obtained and stored in the memory T_ENC.

At a step S29, using a difference between the data of the memory F_ENC which shows the current position of the focusing lens group 2 and the content of the memory T_ENC obtained by the step S28 and a predetermined length of time TIM, the period of the pulses generated by the rotation detecting device 10 (focusing speed information) F_SPD is computed from a speed at which the focusing lens group 2 is driven according to the following formula:

$$F\_SPD = TIM/(T\_ENC - F\_ENC) \qquad (1)$$

At a step S30, a check is made to find if the memory Z_FLAG is in a set state thus indicating that the variator lens group 1 is being driven. If so, the flow comes to a step S32. If the memory Z_FLAG is in a reset state thus indicating that the variator lens group 1 is at a stop, the flow comes to a step S31.

At the step S31, a check is made to find if the content of the memory F_ENC showing the current position of the focusing lens group 2 is equal to the content of the memory T_ENC obtained by the step S28. If so, the flow comes to a step S35. If not, the flow comes to a step S32. At the step S32, an instruction is outputted from the ports P7, P8 and P9 to drive the focusing lens group 2 at the focusing speed F_SPD obtained by the step S29 and toward a position indicated by the content of the memory T_ENC. At a step S33, an interruption from the port INT2 is allowed. At a step S34, since the focusing lens group 2 has been caused to be driven by the step S32, the memory F_FLAG is set. The flow then comes back to the step S12. At the step S35, since the variator lens group 1 is at a stop and the content of the memory F_ENC and the content of the memory T-ENC are equal to each other, the focusing lens group 2 is brought to a stop. At a step S36, interruption from the port INT2 is inhibited. At a step S37, since the focusing lens group 2 has been brought to a stop by the step S35, the memory F_FLAG is reset and the flow comes back to the step S12.

FIG. 11 is a flow chart showing the routine of the interruption from the port INT1. The interruption is described below with reference to FIG. 11.

At a step S41, a timer value (time count value) is inputted from the timer 14 and is stored in the memory TIM_A. At a step S42, the timer 14 is reset. After that, an instruction is given from the port P11 to restart the timer 14. At a step S43, a check is made to find if the content of the memory TIM_A showing the actual speed of the variator lens group 1 is slower than a desired speed shown by the content of the memory Z_SPD. If so, the flow comes to a step S45. If not, the flow comes to a step S44. At the step S44, a check is made to find if the content of the memory TIM_A showing the actual speed of the variator lens group 1 is faster than the desired speed shown by the content of the memory Z_SPD. If so, the flow comes to a step S46.

At the step S45, since the actual speed is too slow, the speed is increased by lowering a frequency applied to the motor 4. At the step S46, since the actual speed is too fast, the speed is lowered by increasing the frequency applied to the motor 4.

Figure 12:
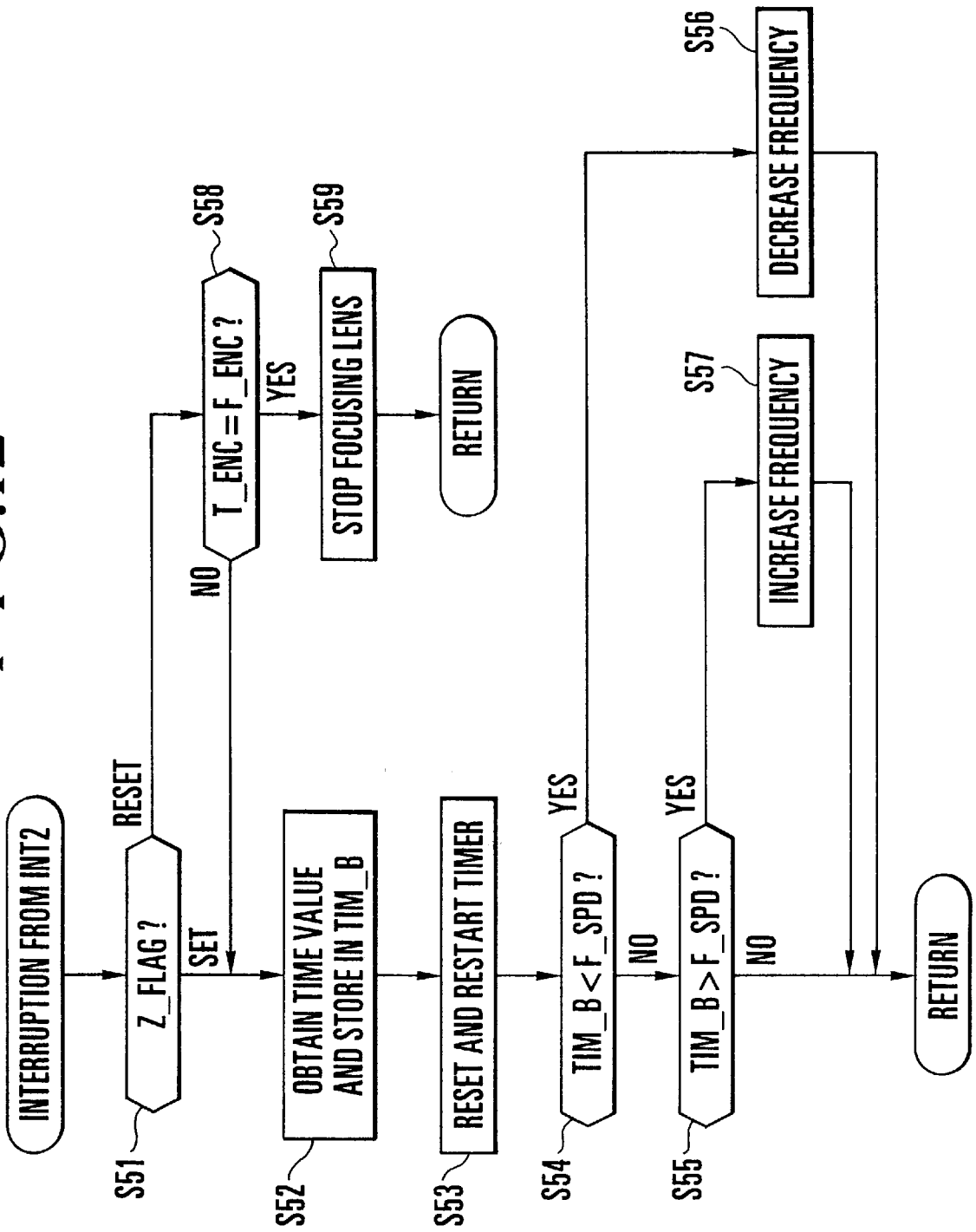
FIG. 12 is a flow chart also showing the operation of the circuit arrangement shown in FIG. 1.

FIG. 12 is a flow chart showing the routine of the interruption from the port INT2. The interruption is described below with reference to FIG. 12.

At a step S51, a check is made for the state of the memory Z_FLAG. If the memory Z_FLAG is found in a set state thus indicating that the variator lens group 1 is being driven, the flow comes to a step S52. If the memory Z_FLAG is found in a reset state, the flow comes to a step S58. At the step S52, a timer value of the timer 15 is inputted from the port O14 and stored in the memory TIM_B. At a step S53, the timer 15 is reset. An instruction is outputted from the port P13 to restart the timer 15. At a step S54, the content of the memory TIM_B which shows the actual speed of the focusing lens group 2 is compared with the content of the memory F_SPD which shows a desired speed to find if the actual speed is slower than the desired speed. If so, the flow comes to a step S56. If not, the flow comes to a step S55.

At the step S55, the content of the memory TIM_B showing the actual speed of the focusing lens group 2 is again compared with the content of the memory F_SPD showing the desired speed to find if the actual speed is faster than the desired speed. If so, the flow comes to a step S57. At the step S56, since the actual speed is too slow, the speed is increased by lowering the frequency to be applied. At a step S57, since the actual speed is too fast, the speed is lowered by increasing the frequency to be applied. At the step S58, the actual position of the focusing lens group as indicated by the memory F_ENC is compared with its desired position as indicated by the memory T_ENC to find if it is equal to the latter. If so, the flow comes to a step S59 to bring the focusing lens group 2 to a stop. If not, the flow comes to a step S52. At the step S59, the focusing lens group 2 is brought to a stop and the interruption routine comes to an end.

As described in the foregoing, the focusing lens group 2 is controlled to be driven at a speed and in the direction shown respectively by the content of the memory F_SPD which shows its speed and the content of the memory T_ENC which shows its desired position, if the variator lens group 1 is being driven. If the variator lens group 1 is at a stop, the focusing lens group 2 is controlled to be brought to a stop according to the content of the memory F_SPD which shows its speed and the content of the memory F_SPD which shows its desired position.

Figure 13:
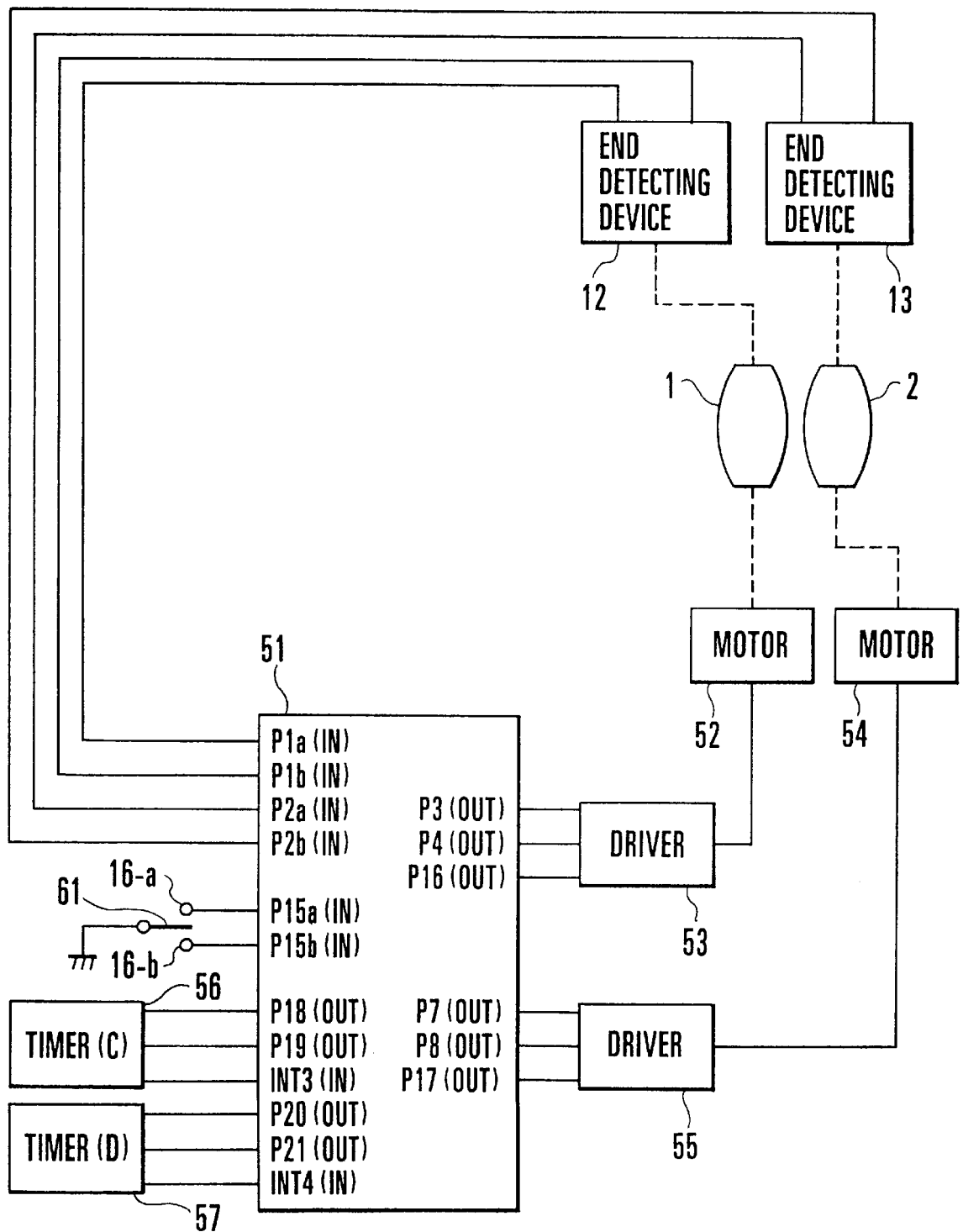
FIG. 13 is a block diagram showing the circuit arrangement of an optical apparatus arranged according to this invention as a second embodiment thereof.

FIG. 13 shows in a block diagram the arrangement of a second embodiment of this invention. FIG. 13 includes a variator lens group 1, a focusing lens group 2 and a microcomputer 51. A stepping motor 52 is arranged to drive the variator lens group 1. A driver circuit 53 is arranged to drive the stepping motor 52. A stepping motor 54 is arranged to drive the focusing lens group 2. A driver circuit 55 is arranged to drive the stepping motor 54. An end detecting device 12 is arranged to output a telephoto end signal and a wide-angle end signal which respectively indicate the telephoto end and wide-angle end positions of the variator lens group 1. An end detecting device 13 is arranged to output an infinity end signal and a near distance end signal which respectively indicate the infinity distance end and nearest distance end positions of the focusing lens group 2. Timers 56 and 57 are arranged to operate under the control of the microcomputer 51. A power zoom switch 16 is arranged for driving the motor 52 to move the variator lens group 1 toward the telephoto end position when the switch 16 is turned on on the side of its one terminal 16-*a* and toward the wide-angle end position when the switch 16 is turned on on the side of another terminal 16-*b*.

The microcomputer 51 has input and output ports. Ports P1*a* and P1*b* are input ports which are arranged to input respectively the telephoto end signal and the wide-angle end signal from the end detecting device 12. Ports P2*a* and P2*b* are input ports which are arranged to input respectively the infinity (distance) end signal and the near distance end signal from the end detecting device 13. Ports P3, P4 and P16 are output ports which are arranged to output respectively a driving on/off signal, a driving direction signal and a speed control pulse signal for the driver circuit 53. Ports P7, P8 and P17 are output ports arranged to output a driving on/off signal, a driving direction signal and a speed control pulse signal for the driver circuit 55. Ports P15*a* and P15*b* are input ports which are provided for monitoring the state of the power zoom switch 16. A port P18 is an output port arranged to output predetermined data for the timer 56. A port P19 is an output port arranged for control over the timer 56. A port INT3 is an input port arranged to input a signal generated when the timer value (time count value) of the timer 56 reaches a predetermined value set by the port P18. A port P20 is an output port arranged to output predetermined data for the timer 57. A port P21 is an output port arranged to be used for control over the timer 57. A port INT4 is an input port arranged to input a signal generated when the timer value of the timer 57 reaches a predetermined value set by the port P20. The input ports INT3 and INT4 have interrupting functions.

Figure 14:
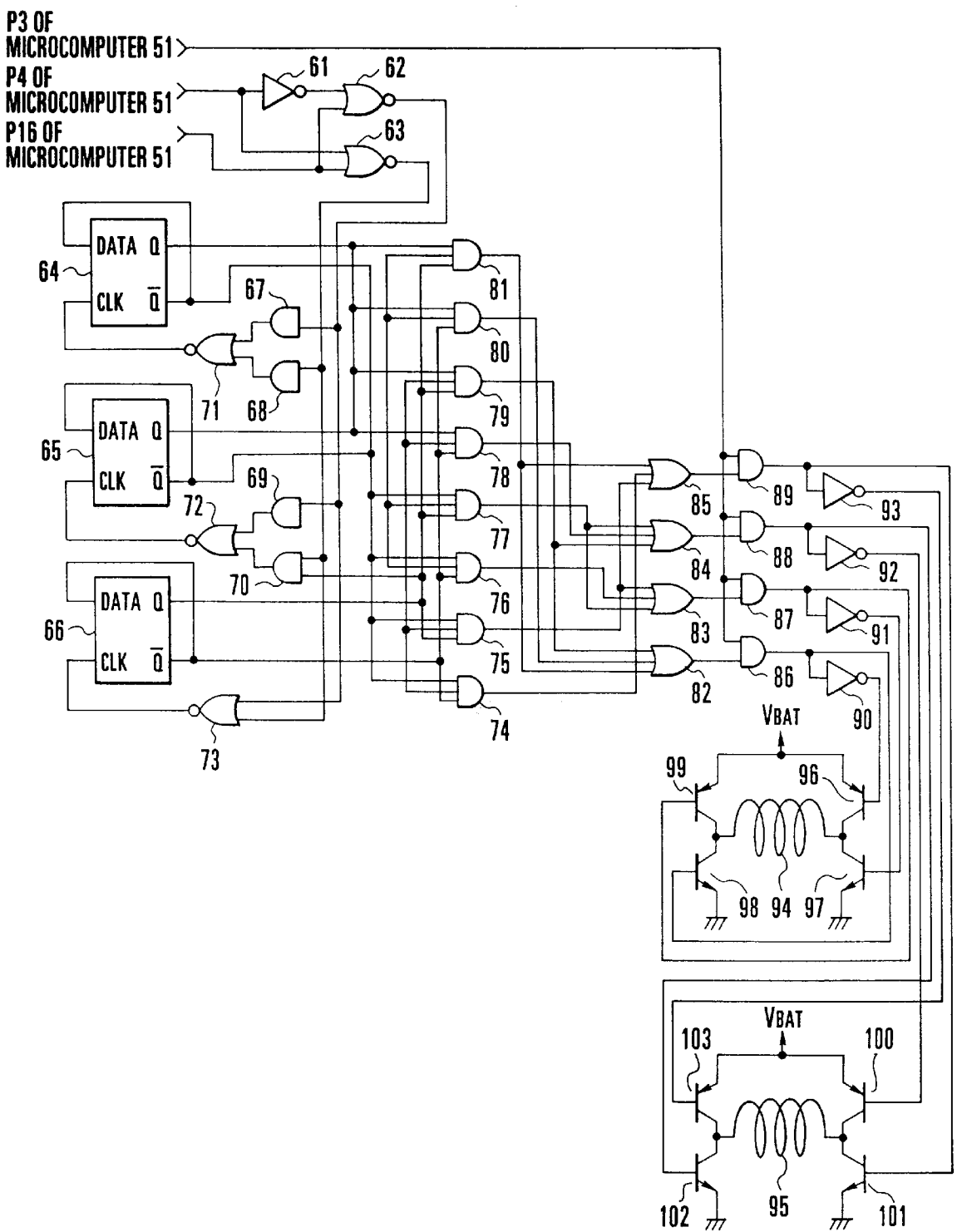
FIG. 14 is a circuit diagram showing the details of arrangement of a motor and a driver shown in FIG. 13.

FIG. 14 shows the details of the stepping motor 52 and those of the driver circuit 53. In FIG. 14, a reference numeral 61 denotes an inverter. Numerals 62 and 63 denote NOR gates. The speed control pulse signal which is outputted from the port P16 of the microcomputer 51 is outputted from the NOR gate 62 or the NOR gate 63 according to the driving direction signal outputted from the port P4 of the microcomputer 51. In the case of this embodiment, the variator lens group 1 is arranged to be driven toward the wide-angle end position when the output of the port P4 is at a low level and to be driven toward the telephoto end position when the output of the port P4 is at a high level. D-type flip-flops 64, 65, 66 are arranged to form a binary counter. AND gates 67, 68, 69 and 70 and NOR gates 71, 72 and 73 form a change-over gate. The change-over gate is arranged to supply clock pulses to the above-stated binary counter to cause the binary counter to count upward in synchronism with the pulse signal coming from the NOR gate 63, in driving the variator lens group 1 toward the telephoto end position, and to cause the binary counter to count downward in synchronism with the pulse signal from the NOR gate 62 in driving the variator lens group 1 toward the wide-angle end position.

AND gates 74 to 81 form a decoder. A high level signal is selectively supplied to the AND gates one after another from the AND gate 74 toward the AND gate 81 every time the count value of the binary counter varies from "0" up to "7". Reference numerals 82 to 85 denote OR gates. The OR gate 82 outputs a high level signal when the count values of the binary counter are 5 to 7. The OR gate 83 outputs a high level signal when the count values of the binary counter are 1 to 3. The OR gate 84 outputs a high level signal when the count values of the binary counter are 3 to 5. The OR gate 85 outputs a high level signal when the count values of the binary counter are 0, 1 and 7. AND gates 86 to 89 are arranged to have its one input connected to the port P3 of the microcomputer 51 and the other input to the output of one of the OR gates 82 to 85. The relation of the count values of the binary counter to the outputs of the OR gates 82 to 85 is as shown in FIG. 15. There are arranged inverters 90 to 93. Coils 94 and 95 form the stepping motor 52. Driving transistors 96 to 99 are provided for the coil 94. Driving transistors 100 to 103 are provided for the coil 95.

The stepping motor 54 is arranged in the same manner as the stepping motor 52 and is, therefore, omitted from description.

FIG. 16 shows in a table the memories disposed within the microcomputer 51. A memory Z_PLS stores the number of pulses of a pulse signal outputted from the port P16. A memory F_PLS is arranged to store the number of pulses of a pulse signal outputted from the port 17. The memories Z_PLS and F_PLS are thus arranged to show the position of the variator lens group 1 and that of the focusing lens group 2 by having addition or subtraction performed to or from these pulse numbers according to the lens group driving direction. There are other memories. A memory Z_PLS1 is arranged to store the content of the memory Z_PLS obtained when both the variator lens group 1 and the focusing lens group 2 are in repose. A memory F_PLS1 is arranged to store the content of the memory F_PLS obtained with both the variator lens group 1 and the focusing lens group 2 are in repose. A memory Z_FLAG is arranged to show whether the variator lens group 1 is in process of being driven or at a stop. A memory T_PLS is arranged to show information on a position of the focusing lens group 2 desired in correcting a defocused state caused by a motion of the variator lens group 1. A memory Z_SPED is arranged to show information on a variator lens group driving speed as expressed in the form of period of pulses outputted from the output port P16 of the microcomputer. A memory F_SPED is arranged to show information on a focusing lens group driving speed as expressed in the form of period of the pulses outputted from the output port P17. A memory F_FLAG is arranged to show whether a defocused state caused by a motion of the variator lens group 1 is in process of being corrected.

The contents of these memories include data of the positions of the focusing lens group 2 in relation to the positions of the variator lens group 1 for various object distances as shown in FIG. 9. This data is used for obtaining the position of the focusing lens group 2 in correcting a defocused state caused by a motion of the variator lens group.

Figure 17A:
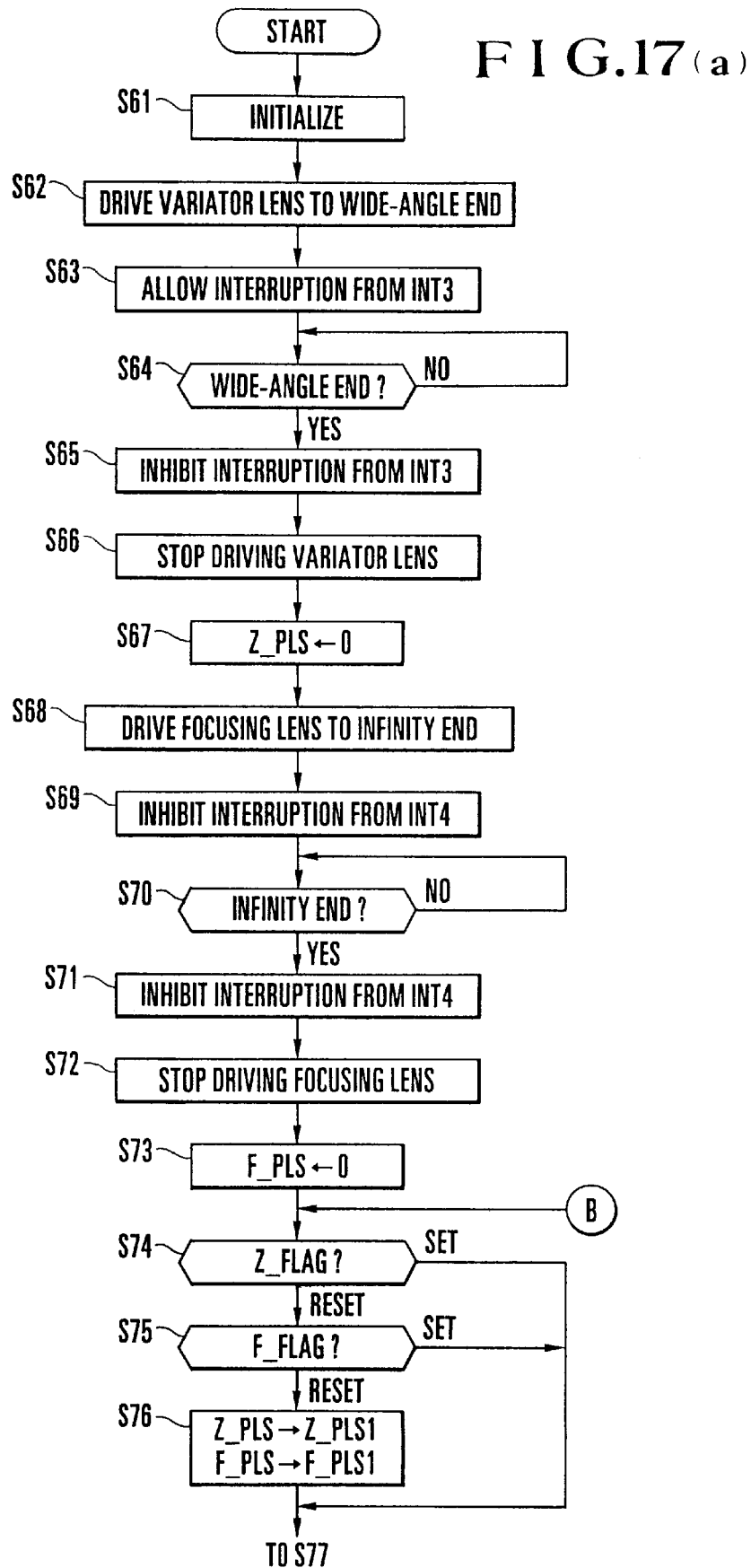

FIGS. 17(*a*) and 17(*b*) are flow charts showing the operation of the microcomputer 51. The second embodiment is further described below with reference to FIGS. 17(*a*) and 17(*b*). At a step S61, when a power supply switch which is not shown is turned on, the microcomputer 51 initializes the memories which are arranged as shown in FIG. 16. At a step S62, since the position of the variator lens group is uncertain and the variator lens group must be reset at a wide-angle end position which is as shown at a part (2) in FIG. 4, a predetermined value Z_SPED0 is stored in the memory Z_SPED and outputted to the ports P3, P4 and P16 in such a way as to cause the variator lens group 1 driven toward the wide-angle end.

At a step S63, an interruption from the port INT3 is allowed. At a step S64, an wide-angle end signal is taken in from the port P1*b* to find if the variator lens group 1 is at the wide-angle end position, as shown at the part (2) in FIG. 4. If not, the steps S64 is repeated.

At a step S65, an interruption from the port INT3 is inhibited. At a step S66, since the variator lens group 1 has reached the wide-angle end position, driving the variator lens group is brought to a stop. At a step S67, "zero" is stored in the memory Z_PLS which shows the position of the variator lens group 1. The position of the variator lens group 1 is thus initialized. At a step S68, since the position of the focusing lens group is uncertain and, therefore, must be reset at its infinity end position which is as shown at the part (4) of FIG. 5, a predetermined value F_SPED0 is stored in the memory F_SPED and outputted to the ports P7, P8 and P17 to drive the focusing lens group toward the infinity distance end.

At a step S69, an interruption from the port INT4 is allowed. At a step S70, an infinity distance end signal is taken in from the port P2*b* to find if the focusing lens group is at its infinity end position which is as shown at the part (4) of FIG. 5. If not, the step S70 is repeated. At a step S71, an interruption from the port INT4 is inhibited. At a step S72, since the focusing lens group 2 is found at the step S70 to have reached the infinity (distance) end position, driving the focusing lens group 2 is brought to a stop. At a step S73, "zero" is stored in the memory F_PLS which shows the position of the focusing lens group 2. The position of the focusing lens group 2 is thus initialized.

At a step S74, a check is made for the state of the memory Z_FLAG. If the memory Z_FLAG is found to be in a set state thus indicating that the variator lens group 1 is in process of being driven, the flow comes to a step S77. If the memory Z_FLAG is found to be in a reset state thus indicating that the variator lens is at a stop, the flow comes to a step S75. At the step S75, a check is made for the state of the memory F_FLAG. If the memory F_FLAG is found to be in a set state thus indicating that the focusing lens group 2 is in process of being driven, the flow comes to a step S77. If the memory F_FLAG is found to be in a reset state thus indicating that the focusing lens group 2 is at a stop, the flow comes to a step S76. At the step S76, since both the variator lens group 1 and the focusing lens group 2 are in repose, the contents of the memories Z_PLS and F_PLS are copied and stored in the memories Z_PLS1 and F_PLS1, respectively.

At a step S77, a check is made to find if the state of the power zoom switch 16 has been tuned on on the side of its terminal 16-*a*. If so, the flow comes to a step S82. If not, the flow comes to a step S78.

At the step S78, a check is made to find if the power zoom switch 16 has been turned on on the side of the other terminal 16-*b*. If so, the flow comes to a step S84. If not, the flow comes to a step S79.

At the step S79, an interruption from the port INT3 is inhibited. At a step S80, since the power zoom switch 16 is neither on the side of the terminal 16-*a* nor on the side of the terminal 16-*b*, the variator lens group 1 is brought to a stop. At a step S81, with the variator lens group 1 having been brought to a stop, the memory Z_FLAG is reset and the flow comes to a step S88.

At the step S82, a telephoto end signal is taken in from the port P1*a* and checked to find if the variator lens group 1 is at the telephoto end position, as shown at the part (1) of FIG. 4. If so, the flow comes to the step S79 to bring the variator lens group 1 to a stop as no further driving toward the telephoto end is possible. If not, the flow comes to a step S83.

At the step S83, since the power zoom switch 16 is in an on-state on the side of the terminal 16-*a* and the variator lens group 1 has not reached the telephoto end, a predetermined value Z_SPED0 is stored in the memory Z_SPED and outputted to the parts P3, P4 and P16 to cause the variator lens group 1 driven toward the telephoto end.

At the step S84, a wide-angle end signal is taken in from the port P1b and checked to find if the variator lens group 1 is at its wide-angle end position, which is as shown at the part (2) of FIG. 4. If so, the flow comes to the step S79 to bring the variator lens group 1 to a stop as it is impossible to further drive the variator lens group 1 toward the wide-angle end. If not, the flow comes to a step S85.

At the step S85, since the power zoom switch is in an on-state on the side of the terminal 16-b and the variator lens group 1 has not reached the wide-angle end position as yet, a predetermined value Z_SPED0 is stored in the memory Z_SPED and outputted to the ports P3, P4 and P16 to have the variator lens group 1 driven toward its wide-angle end position. At a step S86, an interruption from the port INT3 is allowed. At a step S87, since the variator lens group 1 has been caused to be driven at the step S83 or S85, the memory Z_FLAG is set. The flow then comes to a step S88.

At the setep S88, an object distance which is obtained when both the variator and focusing lens groups 1 and 2 are in repose is obtained from the contents of the memories Z_PLS1 and F_PLS1 and also from the data of position of the focusing lens group 2 in relation to that of the variator lens group 1 obtained for each of various object distances as shown in FIG. 9. Further, a position of the focusing lens group 2 at which no focus deviation would take place is obtained from the object distance L and the memory Z_PLS which shows the current position of the variator lens group 1. The position of the focusing lens group 2 thus obtained is stored in the memory T_PLS.

At a step S89, a difference between the content of the memory F_PLS showing the current position of the focusing lens group 2 and the content of the memory T_PLS is obtained. By using this difference and a predetermined time value TIM1, a driving pulse period for the stepping motor 54 to be stored in the memory F_SPED showing the driving speed of the focusing lens group 2 is computed in accordance with the following formula:

$$F\_SPED = TIM1/(T\_PLS - F\_PLS) \quad (2)$$

wherein, the predetermined time TIM1 represents a cycle in which the execution of this step is repeated.

Step S90, a check is made to find if the memory Z_FLAG is in a set state thus indicating that the variator lens group 1 is in process of being driven. If so, the flow comes to a step S92. If the memory Z_FLAG is found to be in a reset state thus indicating that the variator lens group is at a stop, the flow comes to a step S91.

At the step S91, a check is made for a difference between the content of the memory F_PLS which shows the current position of the focusing lens group 2 and the content of the memory T_PLS which is obtained by the step S88. If the difference is zero, the flow comes to a step S95. If not, the flow comes to a step S92.

At the step S92, the contents of the memories F_SPE and T_PLS are outputted to the ports P7, P8 and P17 to cause the focusing lens group 2 to be driven at the speed which is obtained by the step S89 and stored in the memory F_SPE and in the direction shown by the memory T_PLS. At a step S93, an interruption form the port INT4 is allowed. At a step S94, since the focusing lens group 2 has been caused at the step S92 to be driven, the memory F_FLAG is set and the flow comes back to the step S74.

At the step S95, the interruption from the port INT4 is inhibited. At a step S96, since the variator lens group 1 is at a stop and the contents of the memories F_PLS and T_PLS are equal to each other, the focusing lens group 2 is brought to a stop. At a step S97, with the focusing lens group 2 having been brought to a stop by the step S96, the memory F_FLAG is reset and the flow comes back to the step S74.

A routine for interruption from the port INT3, which takes place when the time count value of the timer 56 reaches a predetermined value is as described below.

Figure 18:
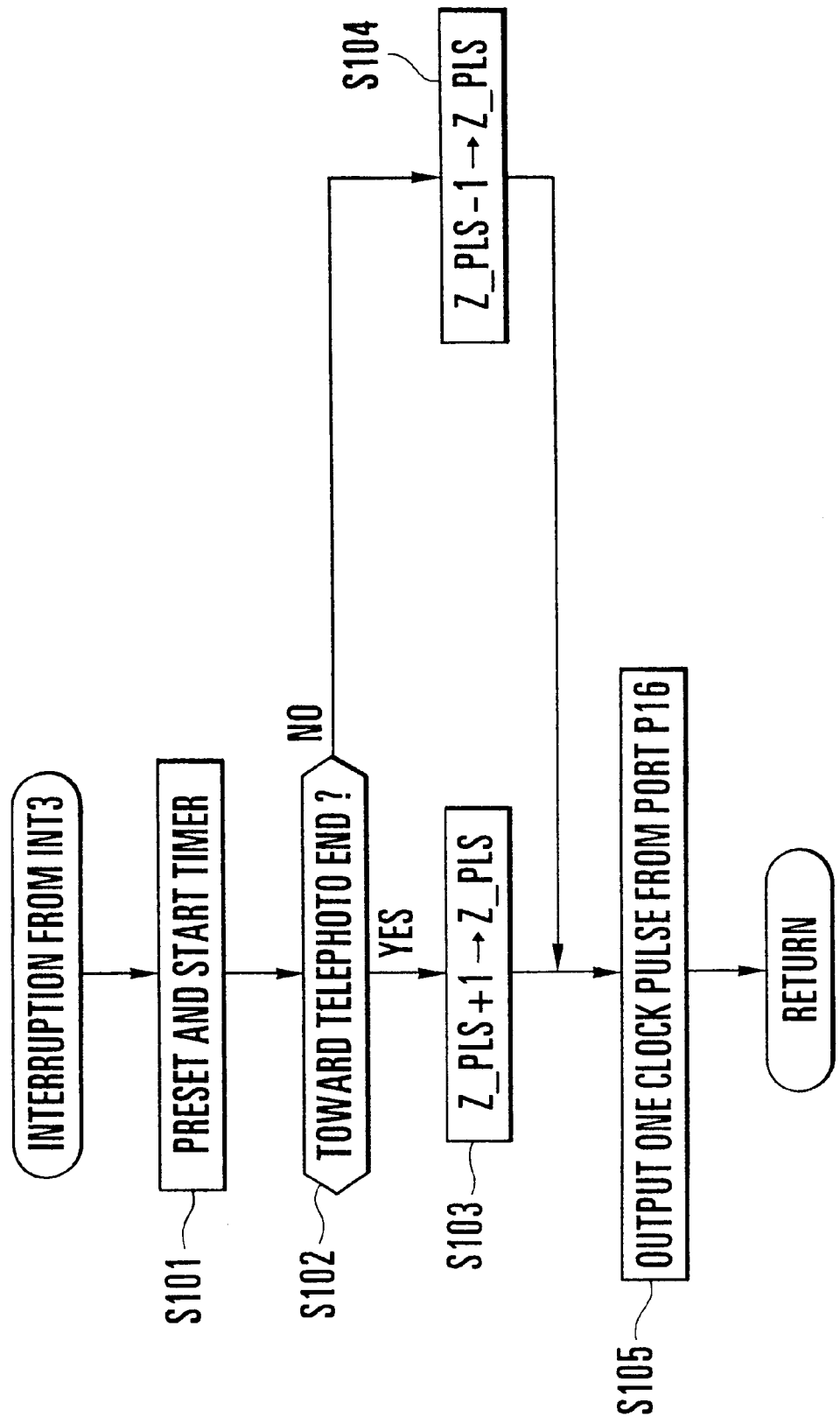
FIG. 18 is another flow chart showing the operation of the circuit arrangement shown in FIG. 13.

FIG. 18 which is a flow chart showing the interruption routine. At a step S101, the content of the memory Z_SPED is outputted to the port P18 to set the timer 56 and, after that, the timer 56 is caused to start. At a step S102, a check is made for the current driving direction of the motor 52. If the motor 52 is driving toward the telephoto end, the flow comes to a step S103. If the motor 52 is driving toward the wide-angle end, the flow comes to a step S104.

At the step S103, the content of the memory Z_PLS is incremented by one as the variator lens group 1 is driven toward the telephoto end to an extent which corresponds to one pulse. At the step S104, the content of the memory Z_PLS is decremented by one as the variator lens group 1 is driven toward the wide-angle end to an extent which corresponds to one pulse. At a step S105, one clock pulse is outputted to the port P16 to drive the motor 52. The interruption routine thus comes to an end.

A routine for the interruption from the port INT4, i.e. the interruption which takes place when the time count value of the timer 57 reaches a predetermined value is described below with reference to FIG. 19.

At a step S111, the content of the memory F_SPED is outputted to the port P20. The timer 57 is set and, after that, is caused to start. At a step S112, a check is made to find if the motor 54 is currently driving in the direction of the infinity end. If so, the flow comes to a step S114. If the diving action is in the direction of the near distance end, the flow comes to a step S113.

At the step S113, the content of the memory F_PLS which shows the position of the focusing lens group 2 is incremented by one as the focusing lens group 1 is being driven toward its near distance end position to an extent corresponding to one pulse. At the step S114, the content of the memory F_PLS is decremented by one as the focusing lens group 2 is being driven toward its infinity end position to an extent corresponding to one pulse.

At a step S115, one pulse is outputted to the port P17 to cause the motor 54 to be driven. At a step S116, a check is made for the state of the memory Z_FLAG. It the memory Z_FLAG is found to be in a reset state thus indicating that the variator lens group 1 is at a stop, the flow comes to a step S117. If the memory Z_FLAG is found to be in a set state, the interruption routine comes to an end.

At the step S117, the content of the memory F_FLS which shows the actual (current) position of the focusing lens group 2 is compared with the content of the memory T_PLS which shows the desired position of the focusing lens group 2. If they are found to be equal to each other, the flow comes to a step S118 to bring the the focusing lens group 2 to a stop. If not, the interruption routine comes to an end. At the step S118, the driving action on the focusing lens group 2 is brought to a stop and the interruption routine comes to an end.

As described above, if the variator lens group 1 is found to be in process of being driven, the focusing lens group 2 is controlled to be driven only at a speed shown by the content of the memory F_SPED and in the direction of a position shown by the content of the memory T_PLS. If the variator lens group 1 is found to be at a stop, the focusing lens group 2 is controlled to be brought to a stop at a speed shown by the content of the memory F_SPED and at a position shown by the content of the memory T_PLS.

The embodiment described is arranged such that, in case where the variator lens is moving, the drive source (A vibration wave motor) for the focusing lens is controlled by deciding the driving speed and direction of the drive source according to the result of the movement of the variator lens and its moving direction. This arrangement enables the embodiment to smoothly move the focusing lens without bringing the focusing lens to a stop before the end of the moving action. Further, when the variator lens comes to a stop, the direction, amount and speed of driving the focusing lens by the drive source are decided and controlled according to the positions of the variaator and focusing lenses. Therefore, according to this invention, an optical apparatus can be arranged to be capable of accurately and promptly attaining an in-focus state.

What is claimed is:

1. An optical apparatus, comprising:

a first lens for zooming;

a second lens located in rear of said first lens in the direction of an optical axis, said second lens being arranged to compensate a shift of a focal plane caused by a motion of said first lens;

a vibration wave motor arranged to serve as a drive source for said second lens;

a decision circuit for deciding a driving direction and a driving speed of said vibration wave motor, said decision circuit being arranged to decide the driving direction and the driving speed by using at least information on a position of said first lens and information on a position of said second lens so as to compensate a shift of the focal plane caused by the motion of said first lens; and control means for driving said vibration wave motor on the basis of the said driving direction and driving speed determined by said decision circuit, said control means indirectly varying control of change of the driving frequency by said position information of said first lens, said control means compares the actual driving speed with the decided driving speed and corrects the difference by changing the driving frequency so as to achieve the driving speed decided by said decision circuit.

2. An optical apparatus according to claim 1, wherein said decision circuit is arranged to decide the driving direction and the driving speed of said vibration wave motor according to a result of a motion of said first lens and the direction of the motion, when said first lens is moving, and according to at least the information on the position of said first lens and the information on the position of said second lens when said first lens comes to a stop.

3. An optical apparatus according to claim 1, wherein said decision circuit is arranged to decide the driving direction and the driving speed of said vibration wave motor in such a way as to allow said vibration wave motor to continue the driving action thereof when said first lens is moving.

4. An optical apparatus according to claim 2, wherein said decision circuit is arranged to decide the driving direction and the driving speed of said vibration wave motor in such a way as to allow said vibration wave motor to continue the driving action thereof when said first lens is moving.

5. An optical apparatus according to claim 1, wherein said second lens is arranged to act also as a focusing lens.

6. An optical apparatus according to claim 2, wherein said second lens is arranged to act also as a focusing lens.

7. An optical apparatus according to claim 1, wherein said decision circuit includes a microcomputer and is arranged to decide the driving direction and the driving speed of said vibration wave motor by using a software program.

8. An optical apparatus according to claim 2, wherein said decision circuit includes a microcomputer and is arranged to decide the driving direction and the driving speed of said vibration wave motor by using a software program.

9. An optical apparatus comprising:

a first lens for zooming;

a second lens located in rear of said first lens in the direction of an optical axis, said second lens being arranged to compensate a shift of a focal plane caused by a motion of said first lens;

a first vibration wave motor arranged to serve as a drive source for said first lens;

a second vibration wave motor arranged to serve as a drive source for said second lens;

a decision circuit for deciding a driving direction and a driving speed of said second vibration wave motor, said decision circuit being arranged to decide the driving direction and the driving speed of said second vibration wave motor in such a way as to shift said focal plane to a specific position when said first vibration wave motor is being driven to move said first lens so as to compensate a shift of the focal plane caused by the motion of said first lens; and control means for driving said second vibration wave motor on the basis of the said driving direction and driving speed decided by said decision circuit, said control means indirectly varying control of change of the driving frequency by said position information of said first lens, said control means compares the actual driving speed with the decided driving speed and corrects the difference by changing the driving frequency so as to achieve the driving speed decided by said decision circuit.

10. An optical apparatus according to claim 9, wherein said decision circuit is arranged to decide the driving direction and the driving speed by using at least information on a position of said first lens and information on a position of said second lens.

11. An optical apparatus according to claim 10, wherein said decision circuit is arranged to decide the driving direction and the driving speed of said vibration wave motor according to a result of a motion of said first lens and the direction of the motion, when said first lens is moving, and according to at least information on the position of said first lens and the information on the position of said second lens when said first lens comes to a stop.

12. An optical apparatus according to claim 9, wherein said decision circuit is arranged to decide the driving direction and the driving speed of said vibration wave motor in such a way as to allow said vibration wave motor to continue the driving action thereof when said first lens is moving.

13. An optical apparatus according to claim 11, wherein said decision circuit is arranged to decide the driving direction and the driving speed of said vibration wave motor in such a way as to allow said vibration wave motor to continue the driving action thereof when said first lens is moving.

14. An optical apparatus according to claim 9, wherein said decision circuit includes a microcomputer and is arranged to decide the driving direction and the driving speed of said vibration wave motor by using a software program.

15. An optical apparatus according to claim 11, wherein said decision circuit includes a microcomputer and is arranged to decide the driving direction and the driving speed of said vibration wave motor by using a software program.

16. An optical apparatus according to claim 13, wherein said decision circuit includes a microcomputer and is arranged to decide the driving direction and the driving speed of said vibration wave motor by using a software program.

17. An optical apparatus according to claim 1, wherein said decision circuit is arranged to decide the driving speed on the basis of a result of detection of the actual driving speed of said vibration wave motor.

18. An optical apparatus according to claim 9, wherein said decision circuit is arranged to decide the driving speed on the basis of a result of detection of the actual driving speed of said second vibration wave motor.

* * * * *

UNITED STATES PATENT AND TRADEMARK OFFICE
CERTIFICATE OF CORRECTION

PATENT NO. : 5,926,325
DATED : July 20, 1999
INVENTOR(S) : Mitsuhiro Katsuragawa It is certified that error appears in the above-identified patent and that said Letters Patent are hereby corrected as shown below:

Col. 15, line 38, delete "determined by" and insert -- decided by --.

Signed and Sealed this

Tenth Day of April, 2001

Attest:

NICHOLAS P. GODICI

Attesting Officer     Acting Director of the United States Patent and Trademark Office